US011323886B2

(12) United States Patent
Bentley et al.

(10) Patent No.: US 11,323,886 B2
(45) Date of Patent: May 3, 2022

(54) COOPERATIVE TARGET EXECUTION SYSTEM FOR UNMANNED AERIAL VEHICLE NETWORKS

(71) Applicant: GOVERNMENT OF THE UNITED STATES AS REPRESENTED BY THE SECRETARY OF THE AIR FORCE, Rome, NY (US)

(72) Inventors: Elizabeth S. Bentley, Clinton, NY (US); Fatemeh Afghah, Flagstaff, AZ (US)

(73) Assignee: United States of America as represented by the Secretary of the Air Force, Rome, NY (US)

( * ) Notice: Subject to any disclaimer, the term of this patent is extended or adjusted under 35 U.S.C. 154(b) by 0 days.

(21) Appl. No.: 16/204,370

(22) Filed: Nov. 29, 2018

(65) Prior Publication Data

US 2019/0289469 A1 Sep. 19, 2019

Related U.S. Application Data

(60) Provisional application No. 62/642,631, filed on Mar. 14, 2018.

(51) Int. Cl.
*H04W 16/10* (2009.01)
*H04W 24/02* (2009.01)
*B64C 39/02* (2006.01)

(52) U.S. Cl.
CPC ......... *H04W 16/10* (2013.01); *B64C 39/024* (2013.01); *H04W 24/02* (2013.01); *B64C 2201/126* (2013.01)

(58) Field of Classification Search
CPC ..... H04W 16/10; H04W 24/02; H04W 84/18; B64C 39/024; B64C 2201/126;
(Continued)

(56) References Cited

U.S. PATENT DOCUMENTS 9,071,973 B2 6/2015 Garcia et al.
2014/0236391 A1* 8/2014 Wood ................. H04B 7/18506
701/2
(Continued)

OTHER PUBLICATIONS

IEEE—A Decentralized Game Theoretic Approach for Team Formation and Task Assignment by Autonomous Unmanned Aerial Vehicles; Rajarshi Bardhan1, Titas Bera2, and Suresh Sundaram, 2017. (Year: 2017).*

(Continued)

*Primary Examiner* — Hassan A Phillips
*Assistant Examiner* — Mohammed S Chowdhury
(74) *Attorney, Agent, or Firm* — AFRL/RIJ; Randall P. Jones

(57) ABSTRACT

An integrated decision making and communication system includes a memory to store a list of resources necessary to execute a mission; a transceiver to send and receive data between communicatively linked devices; and a processor to identify a set of available resources capable of executing the mission based on the data received from the devices; compare the list of resources necessary to execute the mission from the memory with the set of available resources; and identify a combination of the devices to execute the mission based on the comparison of the list of resources necessary to execute the mission and the set of available resources.

18 Claims, 18 Drawing Sheets

(58) Field of Classification Search
CPC .. G06Q 10/0631; G06Q 50/30; G08G 5/0021; G08G 5/0008; G08G 5/0069; G05D 1/0088
USPC .......................................................... 370/310
See application file for complete search history.

(56) References Cited

U.S. PATENT DOCUMENTS

| | | | | |
|---|---|---|---|---|
| 2017/0069214 | A1* | 3/2017 | Dupray | G08G 5/0013 |
| 2017/0229029 | A1* | 8/2017 | Klinger | G01S 13/02 |
| 2018/0096588 | A1* | 4/2018 | Shabah | H04B 7/18504 |
| 2019/0047558 | A1* | 2/2019 | Relihan | G08G 1/096725 |
| 2019/0072392 | A1* | 3/2019 | Haspel | G01C 21/00 |

OTHER PUBLICATIONS

Rovira-Sugranes, A., et al., "Predictive Routing for Dynamic UAV Networks," 2017 IEEE International Conference on Wireless for Space and Extreme Environments (WiSEE), Oct. 10-12, 2017. Concordia University, Montréal, Canada, pp. 43-47.

Razi, A., et al., "Optimal Measurement Policy for Predicting UAV Network Topology," 51st Asilomar Conference on Signals, Systems and Computers (Asilomar'17), Nov. 2017, pp. 1-5.

Korsah, G., et al., "A Comprehensive Taxonomy for Multi-Robot Task Allocation," The International Journal of Robotic Research, vol. 32, No. 12, 2013, pp. 1495-1512.

Schumacher, C., et al., "UAV Task Assignment with Timing Constraints via Mixed-Integer Linear Programming," in AIAA 3rd Unmanned Unlimited Systems Conference, Dec. 2004, pp. 3287-3292.

Darrah, M., et al., "Multiple UAV Dynamic Task Allocation Using Mixed Integer Linear Programming in a SEAD Mission," in AIAA Infotech @ Aerospace Conference, AIAA 2005-7164, Sep. 26-29, 2005, Arlington, Virginia, Abstract only.

Schumacher, C., et al., "Task Allocation for Wide Area Search Munitions," in AIAA Guidance, Navigation, and Control Conference and Exhibit, 2002, ACC02-AIAA1048, pp. 1-4.

Schumacher, C., et al., "Task Allocation for Wide Area Search Munitions via Iterative Network Flow," in AIAA Infotech @ Aerospace Conference, 2005, pp. 1-8.

Dias, M., et al., "Opportunistic Optimization for Market-based Multirobot Control," RSJ International Conference on Intelligent Robots and Systems, 2002, 7 pages.

Gerkey, B., et al., "Sold!: Auction Methods for Multirobot Coordination," IEEE Transactions on Robotics and Automation, vol. 18, No. 5, Oct. 2002, pp. 758-768.

Zhong, L., et al., "Coalition Formation for Multiple Heterogeneous UAVs in Unknown Environment," in 2015 Fifth International Conference on Instrumentation and Measurement, Computer, Communication and Control (IMCCC), Sep. 2015, pp. 1222-1227.

Alighanbaril, M., et al., "Decentralized task assignment for unmanned aerial vehicles," Proceedings of the 44th IEEE Conference on Decision and Control, and the European Control Conference 2005, Seville, Spain, Dec. 12-15, 2005, pp. 5668-5673.

Zhang, K., "Centralized and Distributed Task Allocation in Multi-Robot Teams via a Stochastic Clustering Auction," ACM Transactions on Autonomous and Adaptive Systems, vol. 7, No. 2, 2012, 29 pages.

Korenda, A., et al., "A Hierarchical Stackelberg-Coalition Formation Game Theoretic Framework for Cooperative Spectrum Leasing," in 2017 Conference on Information Sciences and Systems Baltimore, Maryland (CISS 17), 2017, 6 pages.

Bayram, H., et al., "Coalition Formation Games for Dynamic Multirobot Tasks," The International Journal of Robotics Research, 2016., 16 pages.

Arslan, G., et al., "Autonomous Vehicle-Target Assignment: A Game-Theoretical Formulation," Transactions of the ASME, vol. 129, Sep. 2007, pp. 584-596.

Vig, L.., et al., "Multi-Robot Coalition Formation," IEEE Transactions on Robotics, vol. 22, No. 4, Aug. 2006, pp. 637-649.

Saad, W., et al., "A Selfish Approach to Coalition Formation Among Unmanned Air Vehicles in Wireless Networks," 2009 International Conference on Game Theory for Networks, May 13-15, 2009, Istanbul, Turkey, pp. 259-267.

Shehory, O., et al., "Methods for Task Allocation Via Agent Coalition Formation," Artificial Intelligence Journal, vol. 101, Apr. 4, 1998, pp. 165-200.

Service, T., et al., "Coalition Formation for Task Allocation: Theory and Algorithms," Autonomous Agents and Multi-Agent Systems, vol. 22, No. 2, Feb. 24, 2010, pp. 225-248, Abstract only.

Dang, V., et al., "Overlapping Coalition Formation for Efficient Data Fusion in Multi-Sensor Networks," Proceedings, The Twenty-First National Conference on Artificial Intelligence and the Eighteenth Innovative Applications of Artificial Intelligence Conference, vol. 1, Jul. 16-20, 2006, Boston, Massachusetts, pp. 635-640.

Chen, J., et al., "Leader-Follower Formation Control of Multiple Non-Holonomic Mobile Robots Incorporating a Receding-Horizon Scheme," The International Journal of Robotics Research, vol. 29, No. 6, May 19, 2009, pp. 727-747, Abstract only.

Afghah, F., et al., "Cooperative Spectrum Leasing in Cognitive Radio Networks," 2014 National Wireless Research Collaboration Symposium (NWRCS), May 15-16, 2014, Idaho Falls, Idaho, pp. 106-111.

Afghah, F., et al., "A Reputation-Based Stackelberg Game Approach for Spectrum Sharing with Cognitive Cooperation," in 52nd IEEE Conference on Decision and Control, Dec. 10-13, 2013, Florence, Italy, pp. 3287-3292.

Orfanus, D., et al., "Self-Organization as a Supporting Paradigm for Military UAV Relay Networks," IEEE Communications Letters, vol. 20, No. 4, Feb. 3, 2016, pp. 804-807.

Apt, K., et al., "A Generic Approach to Coalition Formation," International Game Theory Review, vol. 11, No. 3, Sep. 2009, pp. 347-367.

Bardhan, R., et al., "A Decentralized Game Theoretic Approach for Team Formation and Task Assignment by Autonomous Unmanned Aerial Vehicles," 2017 International Conference on Unmanned Aircraft Systems (ICUAS), Jun. 13-16, 2017, Miami, Florida, pp. 432-437.

Schumacher, C., et al., "Task Allocation for Wide Area Search Munitions with Variable Path Length," Proceedings of the 2003 American Control Conference, Jun. 4-6, 2003, Denver, Colorado, pp. 1-13.

* cited by examiner

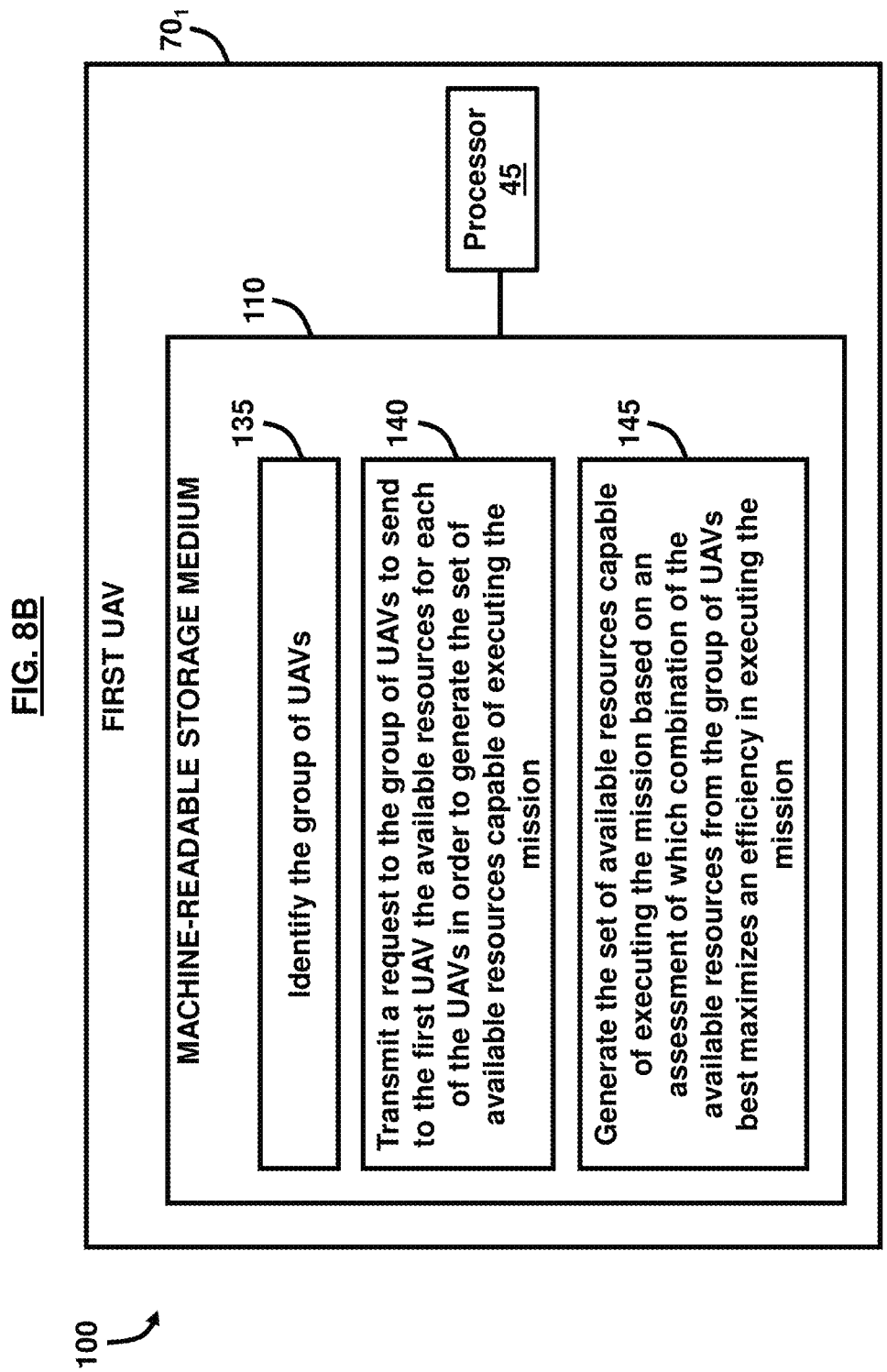

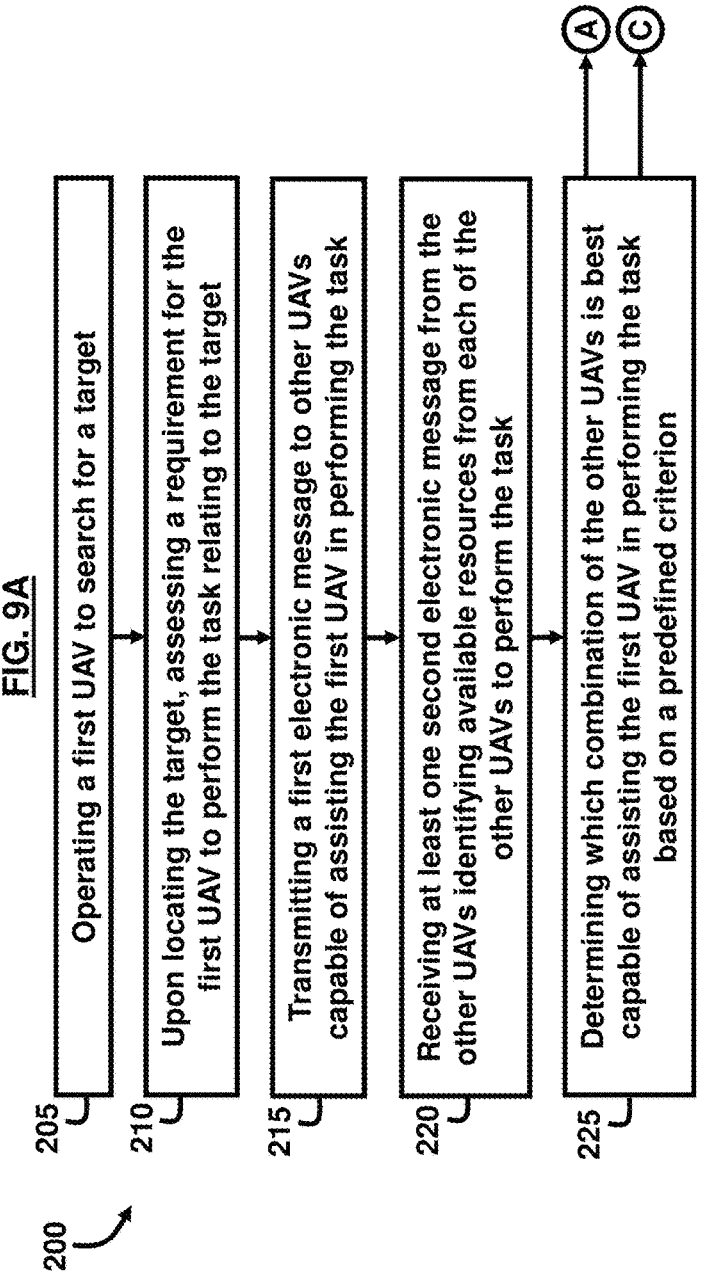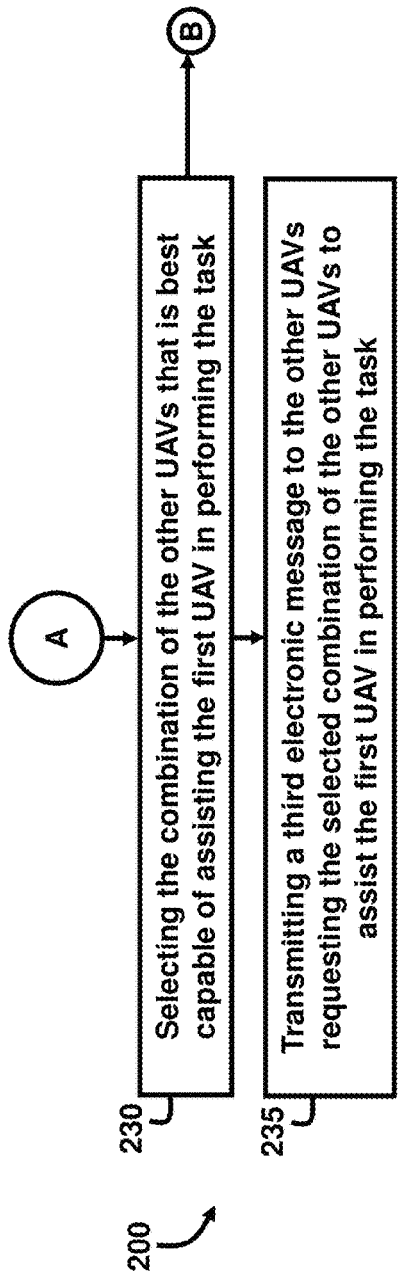

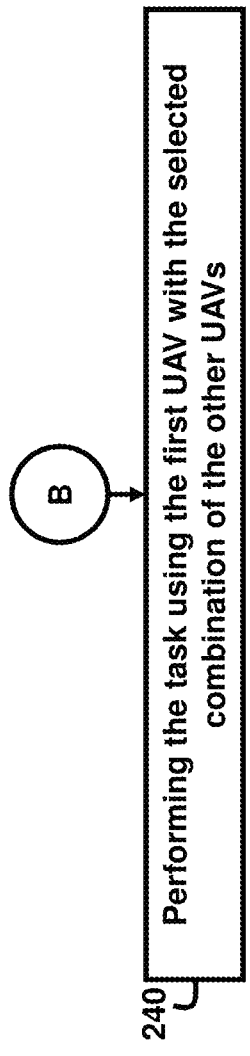

FIG. 9C

240 — Performing the task using the first UAV with the selected combination of the other UAVs

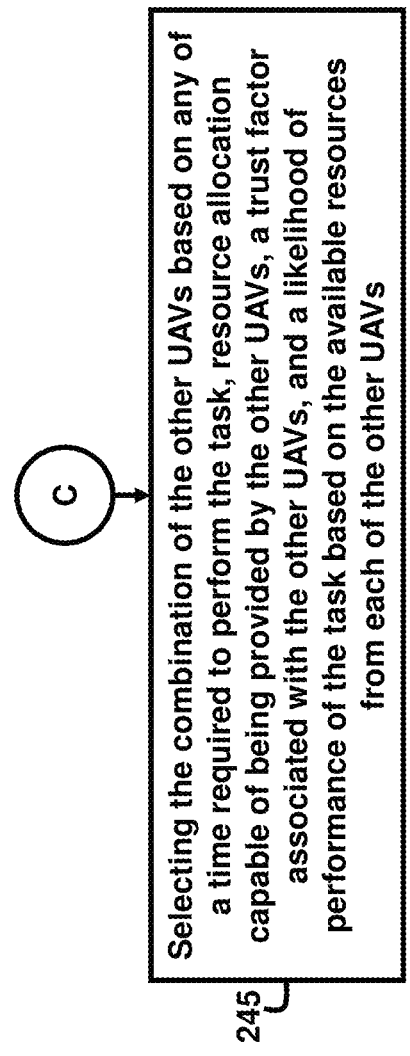

FIG. 9D

245 — Selecting the combination of the other UAVs based on any of a time required to perform the task, resource allocation capable of being provided by the other UAVs, a trust factor associated with the other UAVs, and a likelihood of performance of the task based on the available resources from each of the other UAVs

COOPERATIVE TARGET EXECUTION SYSTEM FOR UNMANNED AERIAL VEHICLE NETWORKS

CROSS-REFERENCE TO RELATED APPLICATION(S)

This application claims the benefit of U.S. Provisional Patent Application No. 62/642,631 filed on Mar. 14, 2018, which is incorporated herein by reference in its entirety.

GOVERNMENT INTEREST

The invention described herein may be manufactured and used by or for the Government of the United States for all government purposes without the payment of any royalty.

BACKGROUND

Field of the Invention

The embodiments herein generally relate to coalition formation techniques, and more particularly to target detection and subsequent task completion in a coalition of devices.

Background of the Invention

Recent advancements in communication and computation systems allow deployment of large teams of Unmanned Aerial Vehicles (UAVs) to cooperatively accomplish complex missions that often cannot be performed by a single. Several features including task coordination and reliable communications are typically required to enable interoperability within the heterogeneous airborne networks, particularly for autonomous operations and providing on-board data processing during the mission. These heterogeneous autonomous vehicle systems could provide a great flexibility to complete compound tasks which are distributed in time and space.

The task allocation problem in multi-agent systems is defined as the process of allocating a set of tasks to groups of agents to ensure timely and efficient task completions, noting the individual capabilities of the agents. Previous solutions to the complex problem of task assignment have involved using different approaches including mixed integer linear programming, dynamic network flow optimization, market-based strategy, finite state machine, and multiple-choice knapsack problem. While in the majority of the aforementioned solutions, the tasks are centrally assigned to the agents by a base station that has complete knowledge about the tasks and often the agents' capabilities; in many dynamic systems, tasks may appear at unpredictable locations and times (e.g., target detection in military settings, as well as search and rescue operations).

Hence, a priori knowledge about these tasks is not always available to the base station. Even when such centralized task allocation techniques exist, they often require computationally intensive solutions even in homogeneous networks and are not easily scalable to systems with a large number of tasks or agents. Noting the computation and communication capabilities of modern devices, the agents can be considered as smart entities with decision-making capabilities. Such cognitive capability may facilitate the implementation of distributed task allocation mechanisms by allowing the agents to observe the environment and monitor the operation of other agents and properly respond to the observed situations.

Coalition formation game is a class of games, in which the players cooperate with each other by forming various subgroups called coalitions. This class of games has been recently used in various applications such as task assignment in multi-agent systems, and communication networks. In conventional solutions of coalition formation for task allocation, the objective is to enhance the efficiency of the formed groups in task performance noting the different capabilities available at the coalition members. Therefore, the agents often consider a solution to be optimal when it maximizes the total utilities of the group in executing the existing tasks with minimum resources. In these solutions, it is assumed that all the agents are fully trustable, and they are obligated to cooperate with one another by utilizing their initially claimed resources to complete the tasks. However, this assumption is far too optimistic since cooperation is not an inherent characteristic of cognitive but potentially self-interested agents. Accordingly, a new solution to cooperative coalition formation is desirable.

BRIEF SUMMARY OF THE INVENTION

In view of the foregoing, an embodiment herein provides an integrated decision making and communication system comprising a memory to store a list of resources necessary to execute a mission; a transceiver to send and receive data between communicatively linked devices; and a processor to identify a set of available resources capable of executing the mission based on the data received from the devices; compare the list of resources necessary to execute the mission from the memory with the set of available resources; and identify a combination of the devices to execute the mission based on the comparison of the list of resources necessary to execute the mission and the set of available resources.

The processor may instruct the transceiver to send messages to the identified combination of the devices to execute the mission. The system may further comprise a first device containing the memory, the transceiver, and the processor to autonomously store, transceive, and process the data without control by a centralized base station; and a plurality of other functionally similar devices communicatively linked to the first device. The processor of the first device groups the plurality of other functionally similar devices based on possible combinations of devices comprising resources capable of executing the mission. The processor of the first device selects the group of the plurality of other functionally similar devices comprising a most efficient utilization of the available resources to execute the mission in a predetermined period of time.

The transceiver of the first device may transmit a proposal to the plurality of other functionally similar devices to request the plurality of other functionally similar devices to combine their available resources to execute the mission; and receives responses from the plurality of other functionally similar devices of whether to they agree to utilize their available resources to execute the mission. The devices may comprise unmanned aerial vehicles (UAVs).

Another embodiment provides a machine-readable storage medium comprising computer-executable instructions that when executed cause a processor of a first UAV to determine resources used to execute a mission; generate a set of available resources capable of executing the mission from a group of UAVs in communication with the first UAV; compare the resources used for executing the mission with the set of available resources; and identify a combination of the UAVs to assist in executing the mission based on the comparison of the resources used for executing the mission and the set of available resources.

In the machine-readable storage medium, wherein the instructions, when executed, further cause the processor to identify the group of UAVs; and transmit a request to the group of UAVs to send to the first UAV the available resources for each of the UAVs in order to generate the set of available resources capable of executing the mission. In the machine-readable storage medium, wherein the instructions, when executed, further cause the processor to generate the set of available resources capable of executing the mission based on an assessment of which combination of the available resources from the group of UAVs best maximizes an efficiency in executing the mission.

In the machine-readable storage medium, wherein the instructions, when executed, further cause the processor to filter out any UAVs from the group of UAVs based on a past performance of executing other missions. In the machine-readable storage medium of claim 8, wherein the instructions, when executed, further cause the processor to filter out any UAVs from the group of UAVs based on a real-time assessment of a performance of any of the UAVs utilization of its available resources in executing the mission.

In the machine-readable storage medium, wherein the instructions, when executed, further cause the processor to filter out any UAVs from the group of UAVs that decline to offer available resources in executing the mission. In the machine-readable storage medium, wherein the instructions, when executed, further cause the processor to select the combination of the UAVs to assist in executing the mission; and transmit a coalition message to the selected UAVs to execute the mission. In the machine-readable storage medium, wherein the instructions, when executed, further cause the processor to generate the set of available resources capable of executing the mission based on assigning a predetermined value to each of the available resources provided by each of the UAVs; and determine which combination of UAVs corresponds to the predetermined value of the available resources to complete the mission without overspending the available resources.

Another embodiment provides a method of autonomously assessing a cooperative performance of a task, the method comprising operating a first UAV to search for a target; upon locating the target, assessing a requirement for the first UAV to perform the task relating to the target; transmitting a first electronic message to other UAVs capable of assisting the first UAV in performing the task; receiving at least one second electronic message from the other UAVs identifying available resources from each of the other UAVs to perform the task; and determining which combination of the other UAVs is best capable of assisting the first UAV in performing the task based on a predefined criterion.

The method may further comprise selecting the combination of the other UAVs that is best capable of assisting the first UAV in performing the task; and transmitting a third electronic message to the other UAVs requesting the selected combination of the other UAVs to assist the first UAV in performing the task. The method may further comprise performing the task using the first UAV with the selected combination of the other UAVs. The method may further comprise selecting the combination of the other UAVs based on any of a time required to perform the task, resource allocation capable of being provided by the other UAVs, a trust factor associated with the other UAVs, and a likelihood of performance of the task based on the available resources from each of the other UAVs. Each of the other UAVs may comprise a different available resource to assist the first UAV in performing the task.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 8B is a block diagram illustrating a system for communicating between a group of UAVs, according to an embodiment herein;

FIG. 9A is a flow diagram illustrating a method of autonomously assessing a cooperative performance of a task, according to an embodiment herein;

FIG. 9B is a flow diagram illustrating a method of selecting a combination of UAVs to perform a task, according to an embodiment herein;

FIG. 9C is a flow diagram illustrating a method of performing a task with a selected combination of UAVs, according to an embodiment herein;

FIG. 9D is a flow diagram illustrating a method of selecting a combination of UAVs to perform a task based on different factors, according to an embodiment herein;

DETAILED DESCRIPTION OF THE INVENTION

Figure 1:
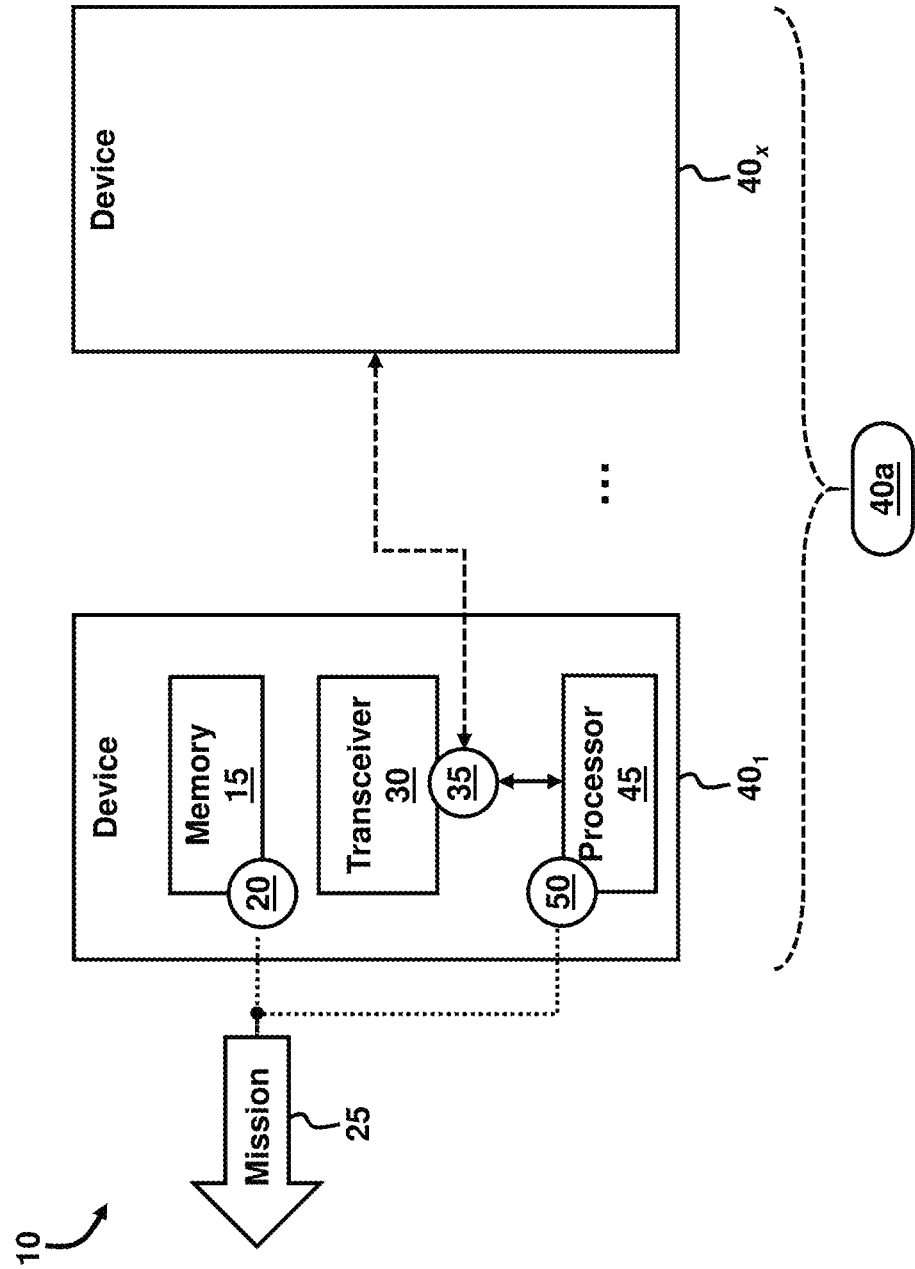
FIG. 1 is a block diagram illustrating an integrated decision making and communication system, according to an embodiment herein.

Embodiments of the disclosed invention, its various features and the advantageous details thereof, are explained more fully with reference to the non-limiting embodiments that are illustrated in the accompanying drawings and detailed in the following description. Descriptions of well-known components and processing techniques are omitted to not unnecessarily obscure what is being disclosed. Examples may be provided and when so provided are intended merely to facilitate an understanding of the ways in which the invention may be practiced and to further enable those of skill in the art to practice its various embodiments. Accordingly, examples should not be construed as limiting the scope of what is disclosed and otherwise claimed.

According to various examples, the embodiments herein provide a leader-follower coalition system in a UAV network that identifies the required resources necessary to carry out a task; e.g., perform a mission. The mission may be any suitable type of mission including military tasks related to targets, search-and-rescue and surveillance, etc. A leader UAV sends a call out to other UAVs in the network asking them to form a coalition based on the available resources that the other UAVs have to assist in completing the task/mission. The leader UAV determines which group of other UAVs can most efficiently complete the task/mission based on comparing the available resources of the other UAVs and the required resources necessary to complete the task/mission. The leader UAV then selects the group of UAVs that meets the efficiency criteria.

Referring now to the drawings, and more particularly to FIGS. 1 through 12, where similar reference characters denote corresponding features consistently throughout, there are shown exemplary embodiments. In the drawings, the size and relative sizes of components, layers, and regions may be exaggerated for clarity.

In some examples, the various devices and processors described herein and/or illustrated in the figures may be embodied as hardware-enabled modules and may be configured as a plurality of overlapping or independent electronic circuits, devices, and discrete elements packaged onto a circuit board to provide data and signal processing functionality within a computer. An example might be a comparator, inverter, or flip-flop, which could include a plurality of transistors and other supporting devices and circuit elements. The modules that are configured with electronic circuits process computer logic instructions capable of providing digital and/or analog signals for performing various functions as described herein. As used herein, the modules may refer to any component or set of components that perform the functionality attributed to the module, and may include a physical processor to execute processor-readable instructions. Additionally, the modules may include the processor, the processor readable instructions, circuitry, hardware, storage media, other components, and combinations thereof. The various functions can further be embodied and physically saved as any of data structures, data paths, data objects, data object models, object files, database components. For example, the data objects could be configured as a digital packet of structured data. The data structures could be configured as any of an array, tuple, map, union, variant, set, graph, tree, node, and an object, which may be stored and retrieved by computer memory and may be managed by processors, compilers, and other computer hardware components. The data paths can be configured as part of a computer CPU that performs operations and calculations as instructed by the computer logic instructions. The data paths could include digital electronic circuits, multipliers, registers, and buses capable of performing data processing operations and arithmetic operations (e.g., Add, Subtract, etc.), bitwise logical operations (AND, OR, XOR, etc.), bit shift operations (e.g., arithmetic, logical, rotate, etc.), complex operations (e.g., using single clock calculations, sequential calculations, iterative calculations, etc.). The data objects may be configured as physical locations in computer memory and can be a variable, a data structure, or a function. In the embodiments configured as relational databases (e.g., such Oracle® relational databases), the data objects can be configured as a table or column. Other configurations include specialized objects, distributed objects, object-oriented programming objects, and semantic web objects, for example. The data object models can be configured as an application programming interface for creating HyperText Markup Language (HTML) and Extensible Markup Language (XML) electronic documents. The models can be further configured as any of a tree, graph, container, list, map, queue, set, stack, and variations thereof. The data object files are created by compilers and assemblers and contain generated binary code and data for a source file. The database components can include any of tables, indexes, views, stored procedures, and triggers.

FIG. 1 illustrates an integrated decision making and communication system 10 comprising a memory 15 to store a list of resources 20 necessary to execute a mission 25. In some examples, the memory 15 may be Random Access Memory (RAM), Read-Only Memory (ROM), a cache memory, hard drive storage, flash memory, or other type of storage mechanism, according to an example. The list of resources 20 may include a description of components, mechanisms, chemicals, or any other type of item or material used to perform a task. In this regard, the mission 25 may comprise any type of task, and may be of a commercial, non-commercial, or military task such as target detection, data collection, target tracking and prosecution, imaging, and surveillance. For example, in one setting, the mission 25 may be to provide supplies through aerial drop-off to people living in a remote location, and the resources 20 may include food, water, medicine, building supplies, etc. Accordingly, the memory 15 stores a list of such resources 20 that are necessary to perform/execute the mission 25. In some examples, the mission 25 may be a predefined static task such that the resources 20 are also similarly predefined/static; i.e., prior to carrying out the mission 25 the resources 20 are set and will not change. However, in other examples the mission 25 may be dynamic and based on real-time effects due to other factors (e.g., environment, third-party influence, technical issues, etc.) the mission 25 may change and as such the resources 20 necessary to execute the mission 25 may also change in real-time. For example, initially the mission 25 may be to supply food to people in a remote location. However, during the course of performing the mission 25, an earthquake may take place requiring the delivery of medicine and building supplies also. Accordingly, the list of resources 20 may change to accommodate the execution of the changing mission 25.

The system 10 comprises a transceiver 30 to send and receive data 35 between communicatively linked devices $40_1 \ldots 40_x$. As used herein, the subscript x refers to any positive integer. In an example, the transceiver 30 may be an electronic device, circuit, or module that is part of a cellular system, and which enables the exchange of data 35 from among networked devices; e.g., devices $40_1 \ldots 40_x$. The data 35 may comprise any type of qualitative and quantitative data capable of being transmitted through wired or wireless transfer protocols, and the data 35 may be encrypted.

The communication that occurs in the system 10 may occur through wired communication or wirelessly, in some examples, in an integrated network of the devices $40_1 \ldots 40_x$. In some examples, the devices $40_1 \ldots 40_x$ may be operatively linked via one or more electronic communication links. For example, such electronic communication links may be established, at least in part, via a communication network such as the Internet and/or other communication networks.

The system 10 further comprises a processor 45. In some examples, the processor 45 may comprise a central processing unit (CPU) of the one or more devices $40_1 \ldots 40_x$. In other examples the processor 45 may be a discrete component independent of other processing components in the one or more devices $40_1 \ldots 40_x$. In other examples, the processor 45 may be a microprocessor, microcontroller, hardware engine, hardware pipeline, and/or other hardware-enabled device suitable for receiving, processing, operating, and performing various functions required by the one or more of the devices $40_1 \ldots 40_x$. Furthermore, the processor 45 may be configured to execute modules by software, hardware, firmware, or combinations thereof, or other mechanisms for configuring processing capabilities. In some examples, the processor 45 may be programmable and may be updated in real-time. In accordance with the embodiments herein, the memory 15, transceiver 30, and processor 45 are contained within any of the devices $40_1 \ldots 40_x$. In some examples, each of the devices $40_1 \ldots 40_x$ comprise their own memory 15, transceiver 30, and processor 45 and are each capable of performing the functions associated with these mechanisms as described herein.

The processor 45 is configured to identify a set of available resources 50 capable of executing the mission 25 based on the data 35 received from the devices $40_1 \ldots 40_x$. For example, the transceiver 30 may receive the data 35 from the devices $40_1 \ldots 40_x$ which contains all of the collective available resources 50 from the devices $40_1 \ldots 40_x$. This data 35 is directly or indirectly transmitted to the processor 45 either by wired or wireless transmission. The processor 45 analyzes the data 35 to determine which of the available resources 50 are capable of executing the mission 25. Moreover, the processor 45 is configured to compare the list of resources 20 necessary to execute the mission 25 from the memory 15 with the set of available resources 50. In this regard, the processor 45 retrieves the list of resources 20 from the memory 15 and compares it with the set of available resources 50 provided by the devices $40_1 \ldots 40_x$. Accordingly, the processor 45 is to determine the resources 20 that are required to execute the mission 25 and compares it with the set of available resources 50 from the devices $40_1 \ldots 40_x$ to determine whether the devices $40_1 \ldots 40_x$ are capable of providing the necessary resources 50 to accomplish the mission 25. Since the list of resources 20 indicate what is necessary (e.g., which resources are required) to perform the mission 25, the processor 45 compares the data 35 containing the available resources 50 with the list of resources 20.

As an alternative to the static configuration described above, in an example of a dynamic or real-time configuration, when the mission 25 changes and the list of resources 20 necessary to perform the mission 25 also changes, or when the devices $40_1 \ldots 40_x$ begin utilizing and/or exhausting the available resources 50 in performing the mission 25, then the transceiver 30 may continue to receive data 35 from the devices $40_1 \ldots 40_x$ and transmit the data 35 to the processor 45 to allow the processor 45 to compare the changing list of resources 20 with the changing set of available resources 50.

Furthermore, in either the static or dynamic configuration, the processor 45 is configured to identify a combination of the devices 40a to execute the mission 25 based on the comparison of the list of resources 20 necessary to execute the mission 25 and the set of available resources 50. In this regard, the combination of devices 40a may be any combination of the devices $40_1 \ldots 40_x$ based on the ability to execute the mission 25 in view of the set of available resources 50 of the devices $40_1 \ldots 40_x$ and the list of resources 20 necessary to execute the mission 25. In one example, the combination of devices 40a may be only one of the devices $40_1 \ldots 40_x$ and in another example, the combination of devices 40a may be the entire set of devices $40_1 \ldots 40_x$, and in still another example, the combination of devices 40a may be only some of the devices $40_1 \ldots 40_x$.

Figure 2:
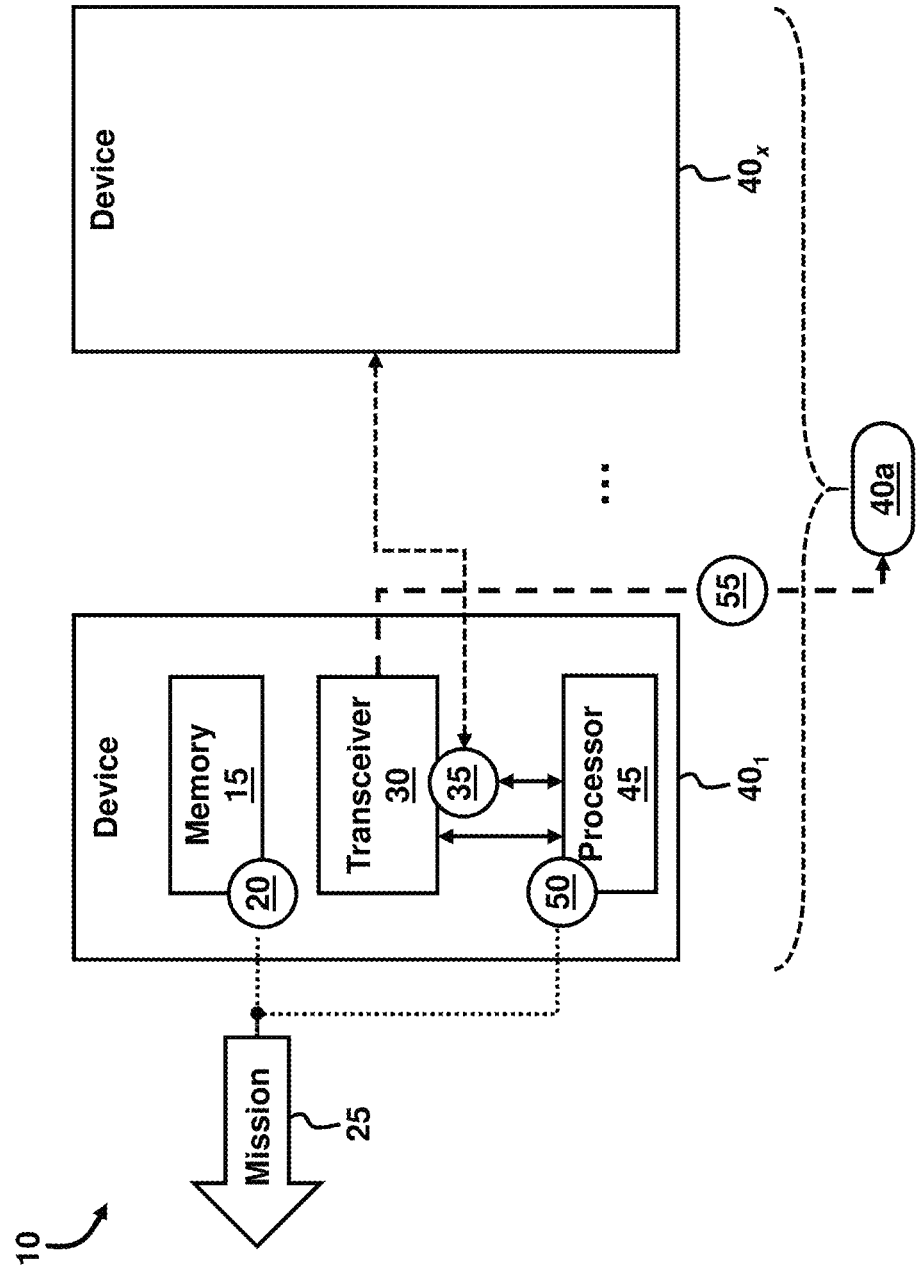
FIG. 2 is a block diagram illustrating transmission of messages from the transceiver of the integrated decision making and communication system of FIG. 1, according to an embodiment herein.

FIG. 2, with reference to FIG. 1, illustrates that the processor 45 instructs the transceiver 30 to send messages 55 to the identified combination of the devices 40a to execute the mission 25. The messages 55 may be electronic messages wirelessly transmitted, which may be encrypted in an example. In an example, the transceiver sends the messages 55 to only the identified combination of devices 40a in order to inform the devices 40a to execute the mission 25. In another example, the transceiver 30 sends the messages 55 to all of the devices $40_1 \ldots 40_x$ and identifies the combination of devices 40a to execute the mission 25. According to an example, only one message 55 is transmitted to the devices $40_1 \ldots 40_x$ and/or the combination of devices 40a. According to another example, separate messages 55 are transmitted to the devices $40_1 \ldots 40_x$ and/or the combination of devices 40a.

Figure 3:
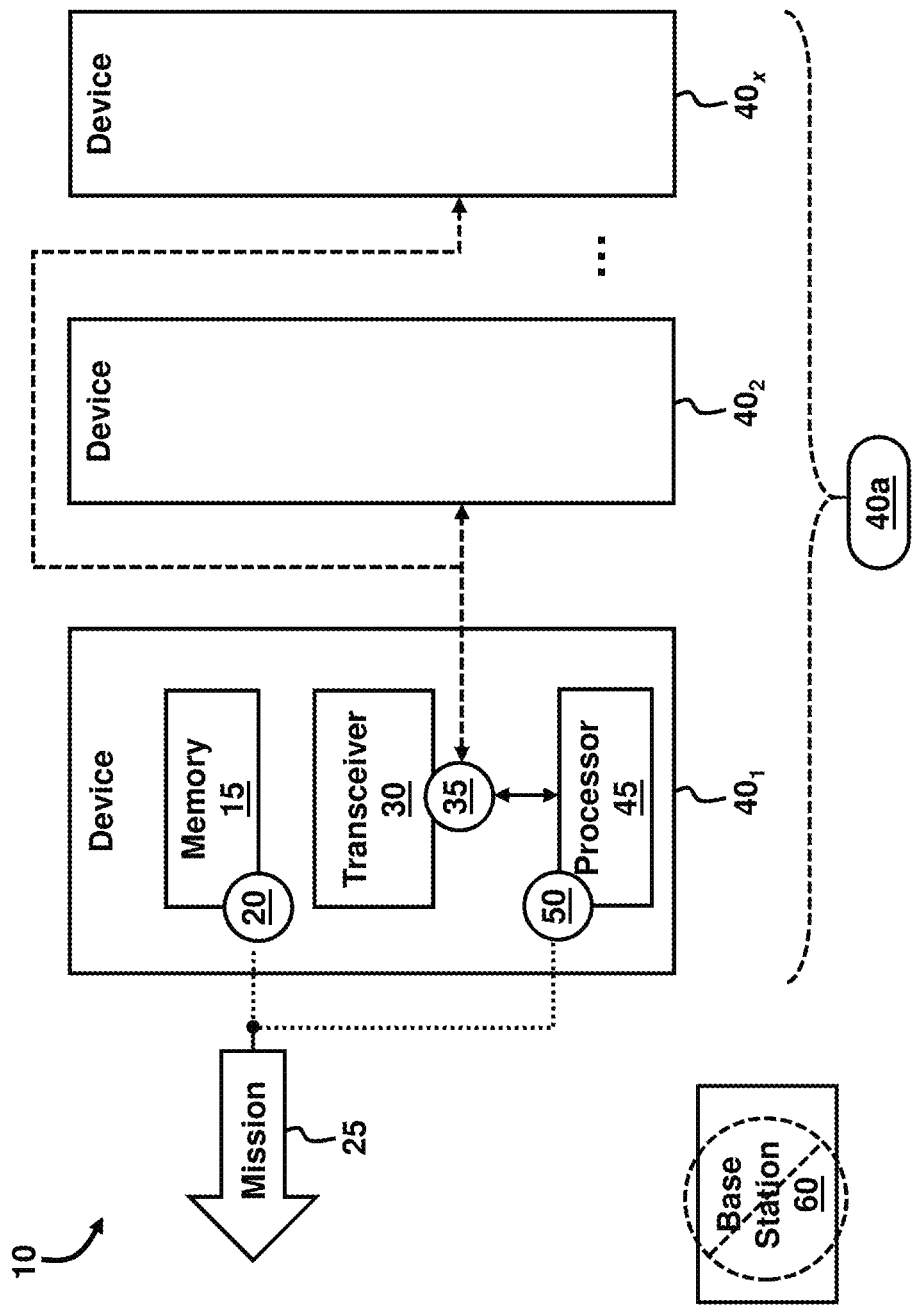
FIG. 3 is a block diagram illustrating multiple devices communicatively linked together in the integrated decision making and communication system of FIG. 1 and without a controlling base station, according to an embodiment herein.

FIG. 3, with reference to FIGS. 1 and 2, illustrates that the system 10 may comprise a first device $40_1$ containing the memory 15, the transceiver 30, and the processor 45 to autonomously store, transceive, and process, respectively, the data 35 without control by a centralized base station 60. In an example, the first device $40_1$ may be considered to be the leader device in the coalition of devices $40_1 \ldots 40_x$. Contrary to the solutions of the conventional systems, the embodiments herein do not rely on the control of a centralized base station 60. A centralized base station 60 may exist in the system 10; however, the centralized base station 60 is not utilized to control the storage by the memory 15, transceiving by the transceiver 30, and/or the processing by the processor 45. Accordingly, the functionality of the first device $40_1$ is autonomous in terms of storing the list of resources 20 necessary to execute a mission 25, sending and receiving data 35 between the communicatively linked devices $40_1 \ldots 40_x$, identifying the set of available resources 50 capable of executing the mission 25 based on the data 35 received from the devices $40_1 \ldots 40_x$, comparing the list of resources 20 necessary to execute the mission 25 from the memory 15 with the set of available resources 50, and identifying a combination of the devices 40a to execute the mission 25 based on the comparison of the list of resources 20 necessary to execute the mission 25 and the set of available resources 50.

The system 10 may comprise a plurality of other functionally similar devices $40_2 \ldots 40_x$ communicatively linked to the first device $40_1$. In this regard, the devices $40_2 \ldots 40_x$ are functionally similar to the first device $40_1$. Additionally, the other functionally similar devices $40_2 \ldots 40_x$ may each comprise a similar memory 15, transceiver 30, and processor 45 as the first device $40_1$. Accordingly, any of the devices $40_1 \ldots 40_x$ may be considered as the leader device in the coalition of the devices $40_1 \ldots 40_x$. The first device $40_1$ together with the other functionally similar devices $40_2 \ldots 40_x$ may collectively form the coalition of the devices $40_1 \ldots 40_x$ such that each of the devices $40_1 \ldots 40_x$ may be communicatively linked with each other. As such, communicatively linking the devices $40_1 \ldots 40_x$ may include wired or wireless linking of the devices $40_1 \ldots 40_x$, and may further include direct or indirect connections therebetween. Regardless, of the type of connection between the devices $40_1 \ldots 40_x$, the devices $40_1 \ldots 40_x$ are configured to send/receive data 35 and messages 55 to one another autonomously; i.e., without control by a centralized base station 60.

Figure 4:
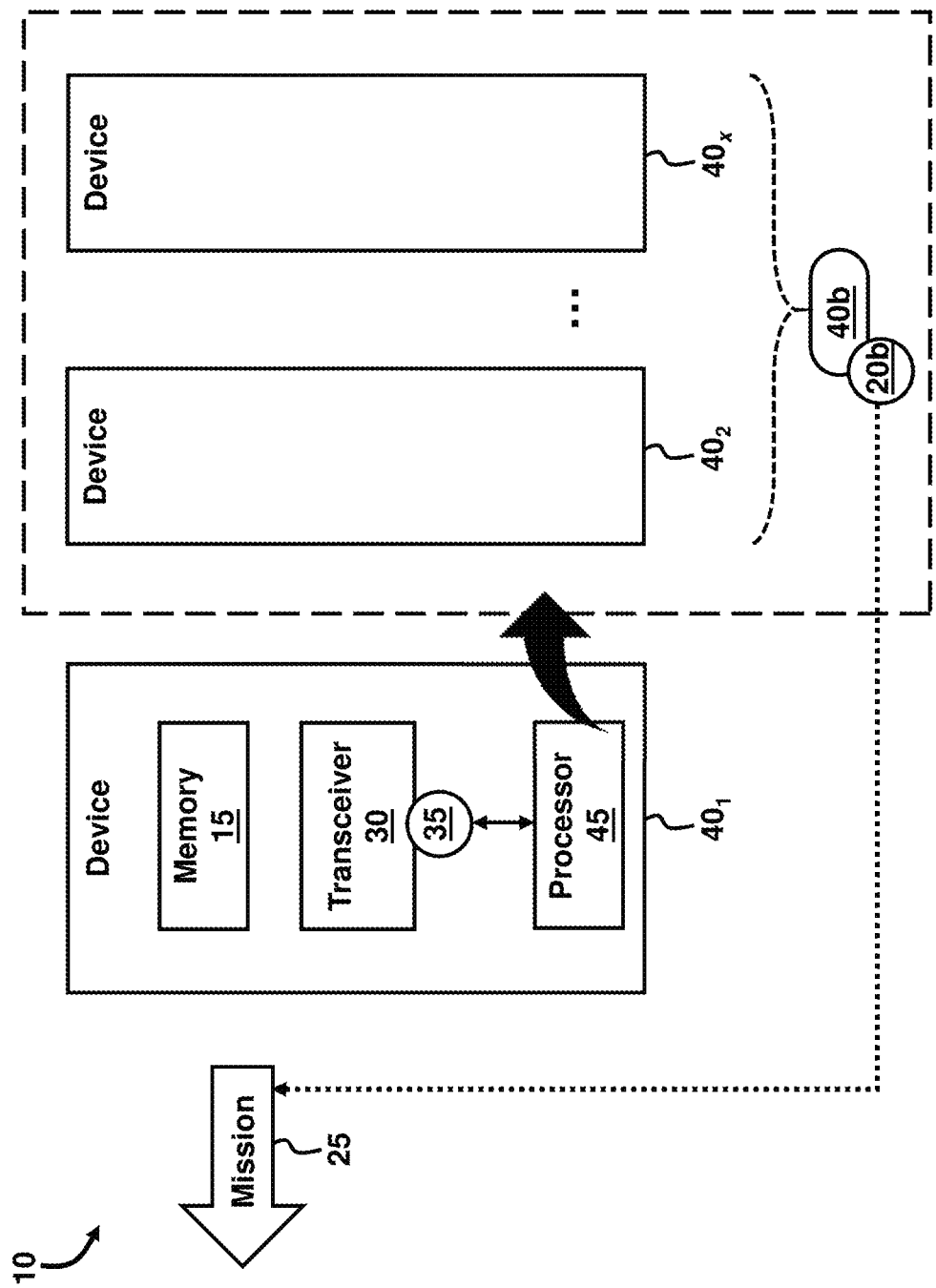
FIG. 4 is a block diagram illustrating grouping of devices capable of executing a mission in the integrated decision making and communication system of FIG. 1, according to an embodiment herein.

FIG. 4, with reference to FIGS. 1 through 3, illustrates that the processor 45 of the first device $40_1$ groups the plurality of other functionally similar devices $40_2 \ldots 40_x$ based on possible combinations of devices 40b comprising resources 20b capable of executing the mission 25. In this example, the first device $40_1$ acts as a leader device in the group of devices $40_1 \ldots 40_x$, and based on the data 35 containing the set of available resources 50 received from the other functionally similar devices $40_2 \ldots 40_x$, the first device $40_1$ determines which combination of devices 40b of the other functionally similar devices $40_2 \ldots 40_x$ including the first device $40_1$ contains the resources 20b capable of executing the mission 25. The processor 45 of the first device $40_1$ may create the possible combinations of the devices 40b by comparing the available resources 20b of each possible combination of the devices 40b with the list of resources 20 stored in memory 15 to ensure that the resources 20b are capable of executing the mission 25. Accordingly, there may be one or more possible combinations of devices 40b capable of executing the mission 25.

Figure 5:
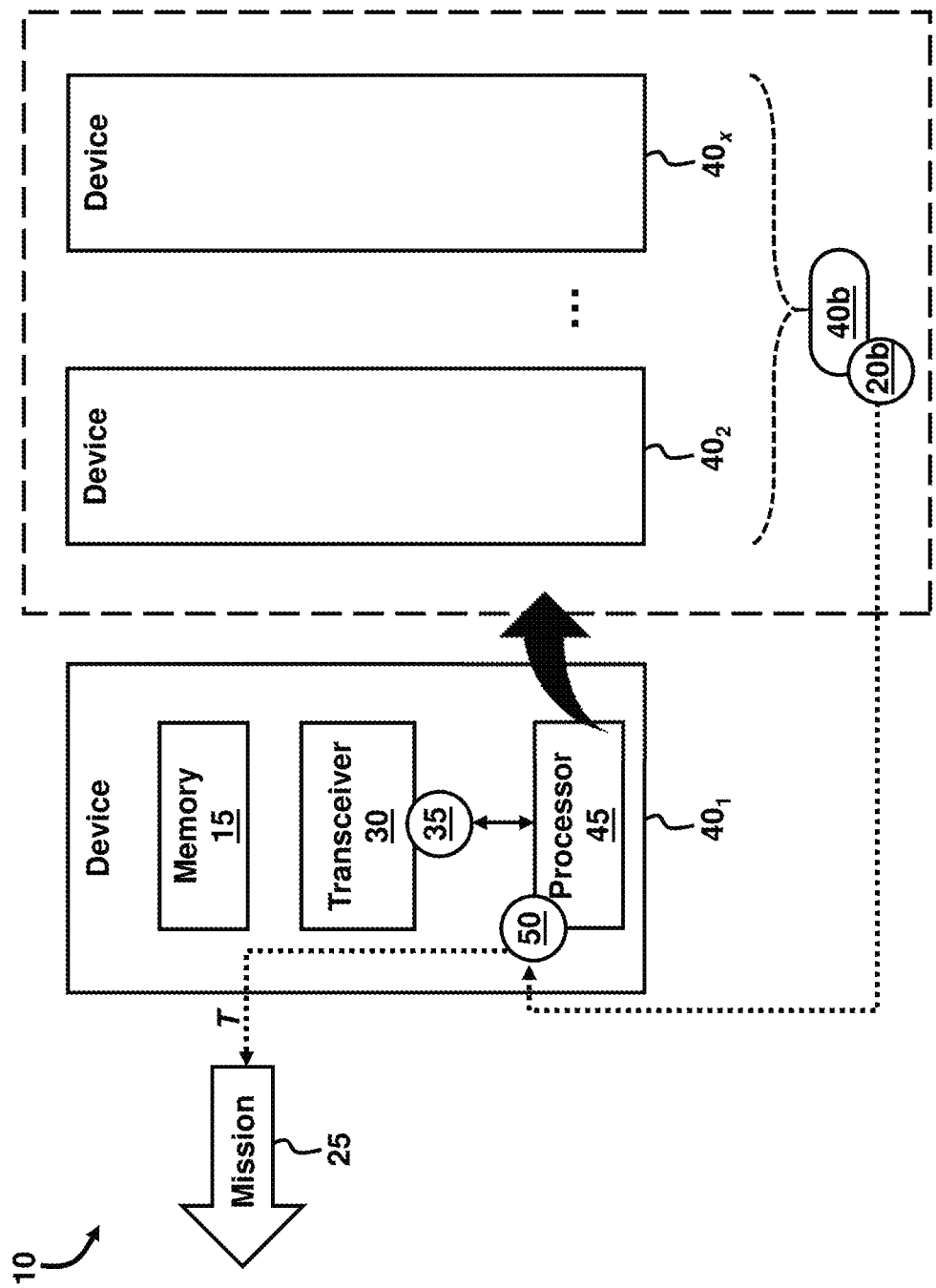
FIG. 5 is a block diagram illustrating selection of a group of devices to execute a mission based on a manner of utilizing available resources in the integrated decision making and communication system of FIG. 1, according to an embodiment herein.

FIG. 5, with reference to FIGS. 1 through 4, illustrates that the processor 45 of the first device $40_1$ selects the group of the plurality of other functionally similar devices $40_2 \ldots 40_x$ comprising a most efficient utilization of the available resources 50 to execute the mission 25 in a predetermined period of time T. In addition to the first device $40_1$ selecting the group of the plurality of other functionally similar devices $40_2 \ldots 40_x$, the first device $40_1$ may include itself with the group of the plurality of other functionally similar devices $40_2 \ldots 40_x$ in order to execute the mission 25. As such, as the leader device in the overall devices $40_1 \ldots 40_x$, the first device $40_1$ may autonomously determine whether to include itself in the combination of devices 40b that will execute the mission 25. The processor 45 of the first device $40_1$ may consider any of several factors in order to establish the combination of devices 40b that will execute the mission 25. In the example of FIG. 5, one such factor is for the processor 45 to consider which combination of devices 40b, possibly including the first device $40_1$, comprises the available resources 50 to perform the mission 25 within the predetermined period of time T, which may be initially established by the processor 45 prior to identifying the set of available resources 50 capable of executing the mission 25 based on the data 35 received from the devices $40_1 \ldots 40_x$, or which may be established in real-time as the other functionally similar devices $40_2 \ldots 40_x$ are in the process of completing the mission 25 or based on real-time status changes of any of the other functionally similar devices $40_2 \ldots 40_x$. Moreover, the processor 45 is configured to consider not only which of the combination of devices 40b comprises available resources 50 capable of executing the mission 25 within the predetermined period of time T, but also factors into the decision, which combination of devices 40b will most efficiently utilize its available resources 50 within the predetermined period of time T such that some of the other functionally similar devices $40_2 \ldots 40_x$ may have functional or performance characteristics (i.e., speed, accuracy, dependability, strength, etc.) that is relayed in the data 35 received by the transceiver 30 and transmitted to the processor 45 of the first device $40_1$, and which the processor 45 of the first device $40_1$ considers in making the selection of the group of devices 40b.

Figure 6:
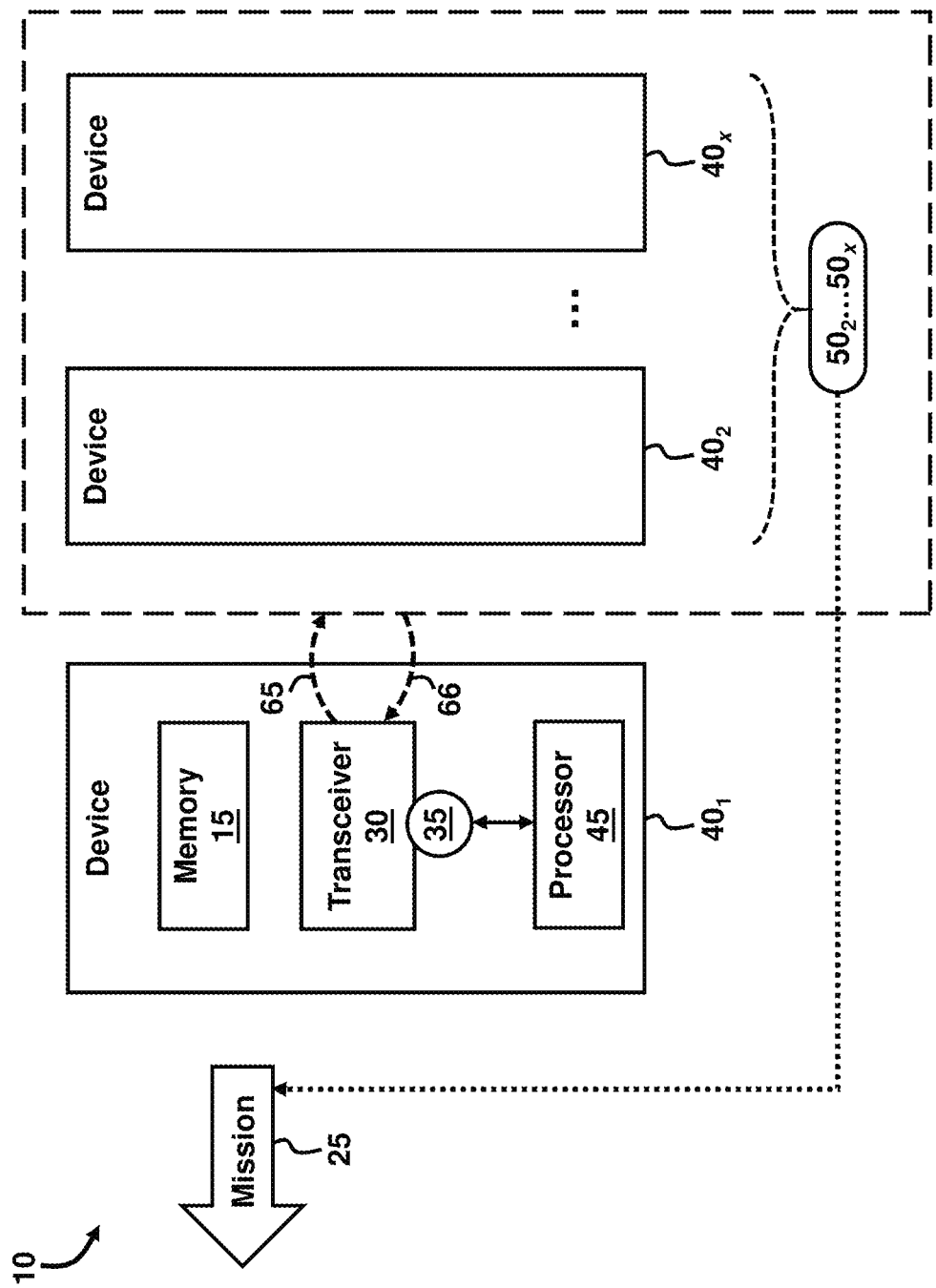
FIG. 6 is a block diagram illustrating a first device transmitting a proposal to other devices in the integrated decision making and communication system of FIG. 1, according to an embodiment herein.

FIG. 6, with reference to FIGS. 1 through 5, illustrates that the transceiver 30 of the first device $40_1$ may transmit a proposal 65 to the plurality of other functionally similar devices $40_2 \ldots 40_x$ to request the plurality of other functionally similar devices $40_2 \ldots 40_x$ to combine their available resources $50_2 \ldots 50_x$ to execute the mission 25. In this example, the first device $40_1$ acts as the leader device in the group of devices $40_1 \ldots 40_x$; however, because each of the devices $40_1 \ldots 40_x$ are individually autonomous, the first device $40_1$ does not control any of the other functionally similar devices $40_2 \ldots 40_x$, and thus the first device $40_1$ transmits the proposal 65, which may be sent with the electronic message 55, to the other functionally similar devices $40_2 \ldots 40_x$ requesting that one or more of the other functionally similar devices $40_2 \ldots 40_x$ combine their respective available resources $50_2 \ldots 50_x$ to execute the mission 25 with or without the first device $40_1$ participating. The transceiver 30 of the first device $40_1$ may receive responses 66 from the plurality of other functionally similar devices $40_2 \ldots 40_x$ of whether to they agree to utilize their available resources $50_2 \ldots 50_x$ to execute the mission 25. Accordingly, although one or more of the other functionally similar devices $40_2 \ldots 40_x$ comprises available resources $50_2 \ldots 50_x$, respectively, to execute the mission 25, any of the autonomous other functionally similar devices $40_2 \ldots 40_x$ may elect not to participate in executing the mission 25 and thus may elect not to combine its available resources $50_2 \ldots 50_x$, respectively, in order to execute the mission 25. As such, the other functionally similar devices $40_2 \ldots 40_x$ transmit their respective responses 66, which may be in the form of electronic messages sent with the data 35, to the first device $40_1$, in reply to the proposal 65 transmitted by the first device $40_1$.

FIG. 7, with reference to FIGS. 1 through 6, illustrates that the devices $40_1 \ldots 40_x$ may comprise a coalition of UAVs $70_1 \ldots 70_x$ in a network 75 such that UAV $70_1$ may be considered a leader UAV and UAVs $70_2 \ldots 70_x$ may be considered follower UAVs as it relates to performing a task or mission 25 on a target 80. There may be one or multiple leader UAVs according to some examples. The target 80 may be any physical item, component, structure, animal, person, mechanism, etc., or combinations thereof, that is/are the subject of the task or mission 25. Furthermore, the target 80 may be multiple targets and may change in real-time. The UAVs $70_1 \ldots 70_x$ may be individually autonomous; i.e., are not controlled by any other device or any other UAV. The processor 45 may identify a combination of the UAVs (e.g., a coalition) 70a to assist in executing the mission 25. The mission 25 may involve performing a task such as searching for a target 80, etc. In this regard, the combination of UAVs 70a may include a first UAV $70_1$ and any other combination of the other UAVs $70_2 \ldots 70_x$. Each of the other UAVs $70_2 \ldots 70_x$ may comprise a different available resource $50_1 \ldots 50_x$ to assist the first UAV $70_1$ in performing the mission 25. The first UAV $70_1$ comprises the processor 45 and may communicate with the other UAVs $70_2 \ldots 70_x$ by transmitting electronic messages 85 (e.g., a first electronic message $85_1$, a second electronic message $85_2$, a third electronic message $85_3$, etc.). The electronic messages 85 may be analogous to the message 55 or proposal 65 described above, or may constitute other messages and/or forms of communication. Any of the UAVs 71 (e.g., UAV $70_3$, for example) from the group of UAVs $70_1 \ldots 70_x$ may be excluded from consideration of contributing to execute the mission 25 for any predetermined reason such as how the UAVs 71 performed in other missions 25a and the status of the UAVs 71 available resources 51 in executing the mission 25.

Figure 7A:
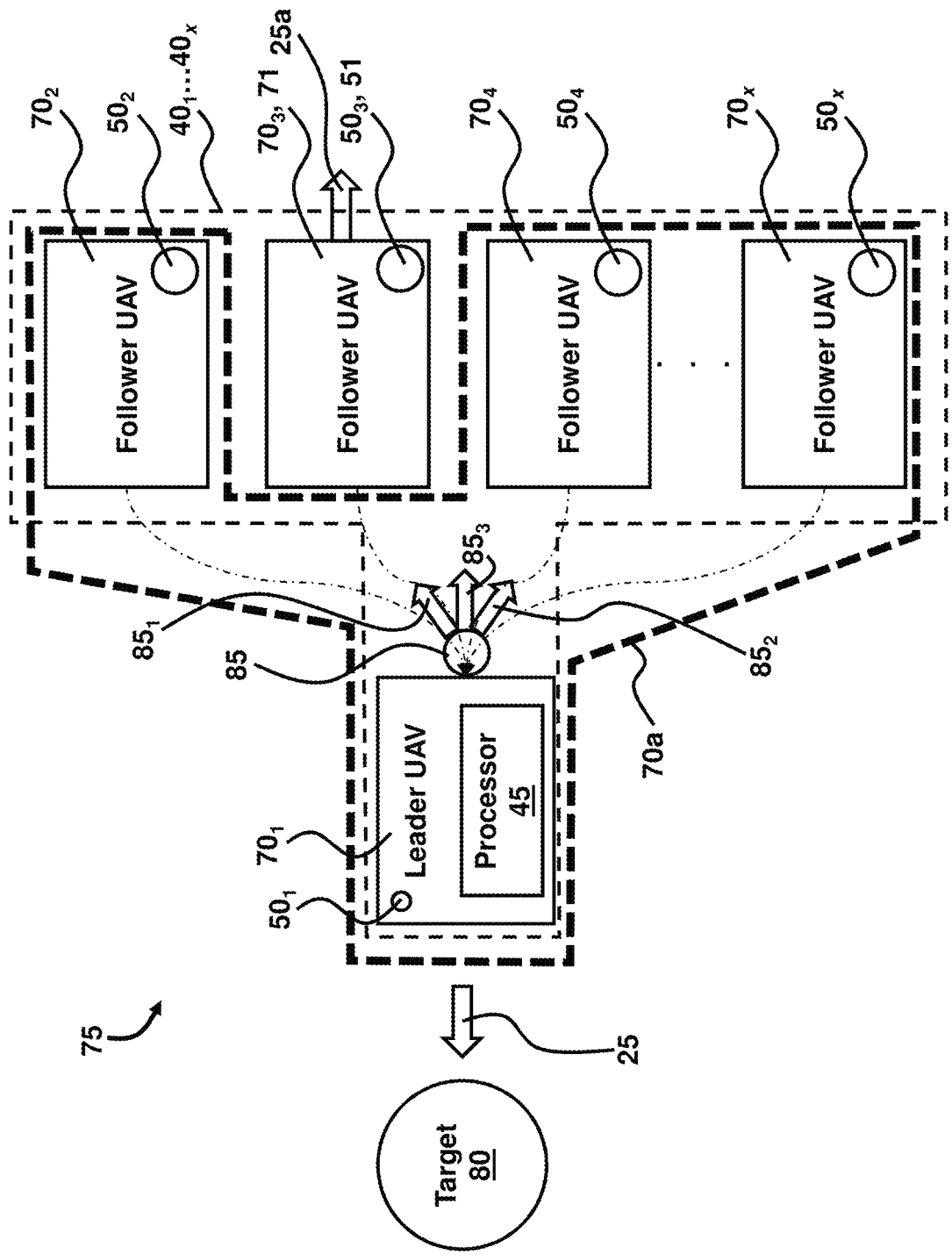
FIG. 7A is a block diagram illustrating a coalition of UAVs grouped to perform a mission, according to an embodiment herein.
Figure 7B:
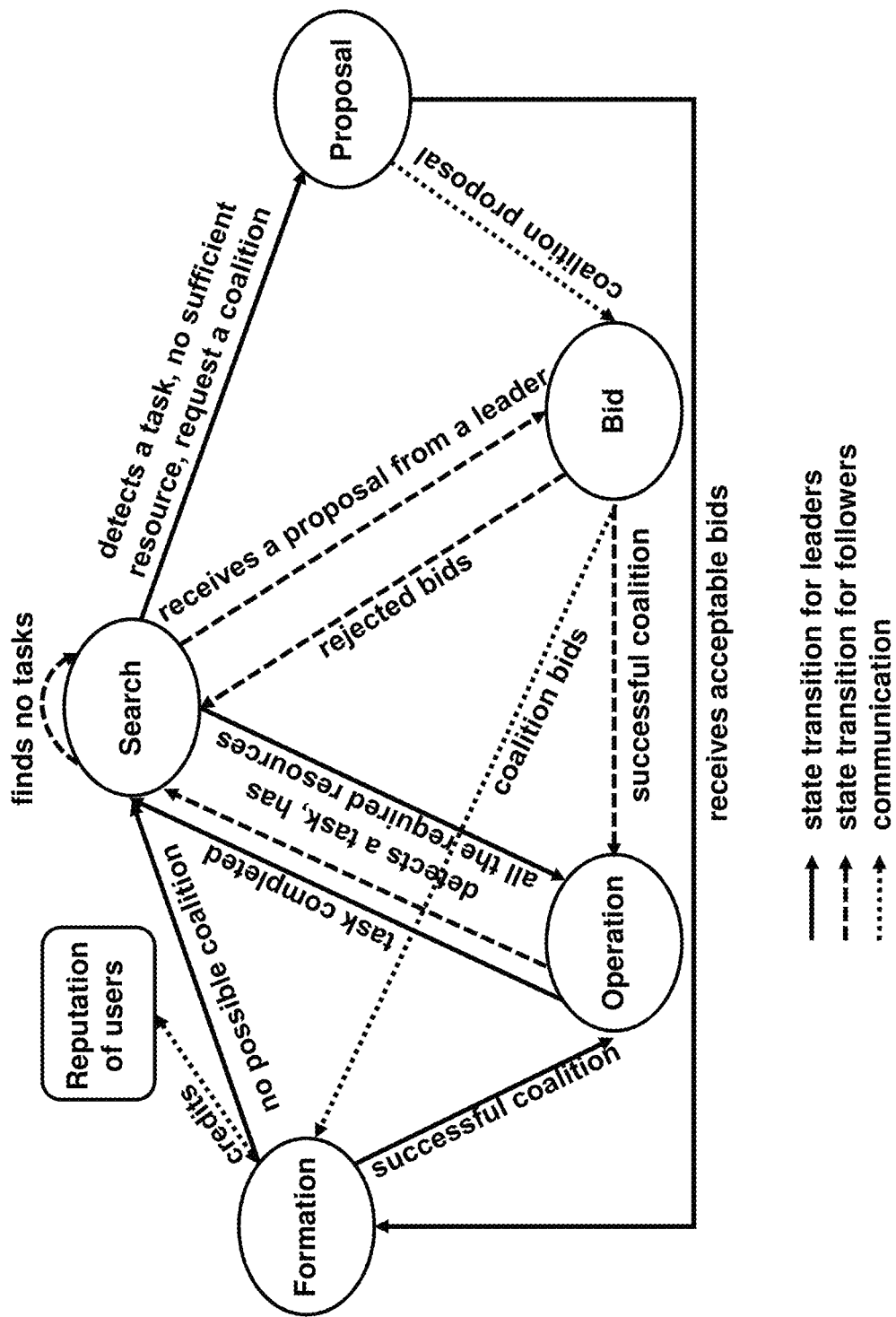
FIG. 7B is state diagram illustrating a coalition formation process, according to an embodiment herein.

FIG. 7A is an example of a commercial scenario of the integrated decision making and communication system 10 of FIGS. 1 through 6 in which the UAVs $70_1 \ldots 70_x$ are communicatively connectable in a network 75 such that the UAVs $70_1 \ldots 70_x$ can belong to different vendors, and they can collect some sort of monetary benefits for participation in each mission 25. In the leader-follower coalition formation integrated decision making and communication system 10 both the efficiency in task performance considering the resource constraints during the coalition formation from the leader's perspective (e.g., first UAV $70_1$), as well as the individual preferences of the followers (e.g., UAVs $70_2 \ldots 70_x$) are considered during the followers' (e.g., UAVs $70_2 \ldots 70_x$) decision making to join the available coalitions 70a. In such a commercial setting, the UAVs $70_1 \ldots 70_x$ may exhibit selfish behaviors by not utilizing the available resources $50_1 \ldots 50_x$ that they originally committed during the coalition formation, with the incentive of saving these resources for future missions to obtain higher benefits. In the system 10, a reputation-based process is considered that keeps the record of the UAVs' $70_1 \ldots 70_x$ cooperative behaviors. The cumulative credits for UAVs $70_1 \ldots 70_x$ are used to identify the trustable UAVs during the member selection procedure in coalition formation. This process involves a trade-off scenario for the UAVs $70_1 \ldots 70_x$. On one hand, they prefer to avoid resource sharing with others to save their limited available resources $50_1 \ldots 50_x$, while on the other hand they need to cooperate with other agents and sustain a good reputation in order to be selected for future missions.

As used in the nomenclature herein, vectors and matrices are represented by lower-case and upper-case underlined letters, respectively. The notations $(.)^*$, $(.)^T$ and $(.)^H$ demonstrate the conjugate, transpose and conjugate transpose (Hermitian) operations, respectively. The real value and imaginary values are shown by $\Re\{.\}$ and $\Im\{.\}$. The diagonal matrix $\underline{A}=\text{diag}\{a\}$ is a matrix whose diagonal elements are the elements of the vector a. Finally, the function $\gamma_{L,\epsilon}(x)$ for $x>0$ is defined as:

$$\begin{cases} x & x \leq 1+\epsilon \\ L & \text{Otherwise} \end{cases},$$

for a given value of L and small value of $\epsilon$, giving: $\gamma_{L,\epsilon}(x)=\gamma_{L,0}(x)$.

A heterogeneous system of NUAVs, $U=\{U_1, U_2, \ldots, U_N\}$ is considered, where the UAVs (e.g., UAVs $70_1 \ldots 70_x$) can form various coalitions 70a to accomplish the dynamic tasks in the network 75. Suppose that the $i^{th}$ UAV is assigned with a capability vector $r_i=[r_i^1, r_i^2, \ldots, r_i^{N_r}]^T$ with $r_i^j \geq 0$, $j=1, 2, \ldots, N_r$, that identifies the available resources at this agent assuming that there are $N_r$ different types of resources in the network 75. Each resource can be either consumable or non-consumable. If the $i^{th}$ UAV does not have resource j, then $r_i^j=0$, and if resource j is non-consumable, then $r_i^j=\infty$. This vector can vary over time based on the amount of resources the UAVs (e.g., UAVs $70_1 \ldots 70_x$) consume to complete the tasks.

A coalition of users, named $S_k$, is a non-empty subset of UAVs, $S_k \subset U$ that handles task k. It is assumed that each coalition of UAVs (e.g., coalition of UAVs 70a) will handle one target 80 at a time. Moreover, a sparse distribution of targets 80 in the environment is considered, hence noting the potential distances among the formed coalitions 70a, it is assumed that each UAV (e.g., UAVs $70_1 \ldots 70_x$) can be only a member of one of these coalitions 70a at a certain time. Hence, the coalitions 70a are non-overlapping, meaning that $S_k \cap S_j = \phi$. The coalition of all UAVs, U is the grand coalition and a coalition that only contains one UAV is called a singleton coalition. Each coalition $S_k$ is associated with a vector of available resources which is shown by $R_k=[R_k^1, R_k^2, \ldots, R_k^{N_r}]_T$ with $R_k^j \geq 0$, $j=1, 2, \ldots, N_r$. For simplicity, one may assume that the vector $R_k$ is additive over the elements' resource vectors in the coalition; i.e., $R_k=\Sigma_{j \in S_k} r_j$.

It is assumed that the UAVs $70_1 \ldots 70_x$ operate in an unpredictable environment, where targets 80 of various types with different resource requirements appear in random time and locations and move freely afterwards. Therefore, a base station 60 is not aware of the potential targets 80. It is assumed that all the UAVs have the capability of searching for new targets in a limited geographical field, and the target detection is performed by the UAVs independent (i.e., autonomous) of the base station 60. The procedure of prosecuting a target 80 is defined as a compound task to be accomplished by a coalition, such that the term task can refer to a set of multiple sub-tasks required to prosecute a target 80. The tasks can differ inherently based on the characteristics of their corresponding targets 80; hence the number, duration, and location of tasks vary over time. Since each task is associated to a target 80, the terms target and task may be used interchangeably herein.

When a UAV (e.g., UAV $70_1$) detects a task k, it determines the type and amount of the resources 20 required to carry out this task; i.e., $\Gamma_k=[\tau_k^1, \tau_k^2, \ldots, \tau_k^{N_r}]^T$, where $\tau_k^1 \geq 0$. If this UAV (e.g., UAV $70_1$) does not have sufficient resources $50_1$ to perform the detected task, it calls for a coalition formation and serves as the coalition leader. Since the base station 60 has no information regarding the existing targets 80 in the network 75, the member UAVs (e.g., UAV $70_1 \ldots 70_x$) of each coalition 70a are configured to listen to the radio communication of a target 80 and forward it to the base station 60. In other words, a coalition of UAVs 70a is supposed to relay the target's message $s_k$ with $E\{s_k^* s_k\}=1$ to the base station 60. According to the embodiments herein, first each leader UAV $70_1$ forms an initial coalition of the available UAVs UAV $70_1 \ldots 70_x$ to maximize the efficiency in task performance for the encountered target 80, and send a request (e.g., proposal 65) to join the coalition to the selected followers. Then, the follower UAVs $70_2 \ldots 70_x$ observe the formed coalitions 70a by different leaders and decide to join the coalition 70a that benefits them the most. The details of the coalition formation procedure are further described below. In order for a leader (e.g., UAV $70_1$) to form a coalition 70a, it takes into account several factors including i) collecting the required resources 20 to perform a task, ii) traveling time of the UAVs $70_1 \ldots 70_x$ to the task, and iii) the quality of service (QoS) of target message's communication at the base station 60. The goal of this combinational complex optimization problem is to perform the tasks in timely and resource efficient manner. This goal suggests that the members of a newly formed coalitions 70a should collectively have all the required resources 50 to perform the encountered task, while minimally surpassing the task requirements. Other associated costs to coalition formation include a higher chance of UAVs' collisions when having more UAVs in a coalition 70a, as well as heavier signaling loads for the members to exchange the necessary information.

Another criterion in coalition formation from the perspective of the leaders (e.g., UAV $70_1$) is the deadline to complete a task. Hence, the leaders (e.g., UAV $70_1$) take into account the traveling time of the UAVs $70_1 \ldots 70_x$ to the task in order to choose the members of the coalition 70a. For this purpose, $\delta_{i,k}$ is defined as the traveling time of the $i^{th}$ member of the coalition to target k location that should be less than or equal to a preferred threshold $f_\delta(\rho)$ as a function of field radius $\rho$.

One aspect of the embodiments herein is to identify the reliable UAVs (e.g., UAVs in coalition 70a) in the network 75 by the leaders (e.g., UAV $70_1$) to join the coalition(s) and filter out any UAVs (e.g., UAV 71) with selfish behavior. Such networks 75 may be prone to suffer from both malicious/intruding UAVs as well as selfish ones. Accordingly, the technique provided by the embodiments herein prevent potential selfish behavior of legitimate non-altruistic UAVs in not spending their resources after joining a coalition to encourage cooperation among them. This is facilitated by defining a cumulative cooperation credit for each UAV that indicates its cooperative behavior in terms of resource sharing during task completion over the course of time. On one hand, since the leaders (e.g., UAV $70_1$) prefer to select the potential followers (e.g., UAVs $70_2 \ldots 70_x$) with higher credits, the UAVs $70_2 \ldots 70_x$ are motivated to maintain a good cooperative credit, as further described below. On the other hand, the follower UAVs $70_2 \ldots 70_x$ similar to other types of cognitive agents may act selfishly and avoid consuming their resources after joining a coalition 70a. The incentive behind this behavior is to save their limited available resources for future missions to earn more monetary benefits.

The coalition formation process may occur as follows: First, the coalition leader (e.g., UAV $70_1$) broadcasts a proposal 65 to form a coalition 70a. Then, the UAVs who possess at least one of the required resources 20 can provide a response 66 to this request by reporting their available resources 50 as well as their current positions. This may be referred to as the bid process. The coalition leader (e.g., UAV $70_1$) then evaluates all the bids by assessing the resources offered by the volunteer UAVs (e.g., UAVs $70_2 \ldots 70_x$), their estimated arrival time, their cooperative credits as well as the provided QoSs for the relaying services during the formation process to determine if a coalition 70a can be formed to complete the encountered task. If a coalition 70a cannot be formed, the coalition leader (e.g., UAV $70_1$) informs the UAVs (e.g., UAVs $70_2 \ldots 70_x$), otherwise the coalition leader (e.g., UAV $70_1$) provides the selected UAVs in the coalition 70a with information about the tasks (e.g., required resources and location of the target 80). The UAVs 71 that are not selected by the coalition leader (e.g., UAV $70_1$) go back to the search mode. When a UAV receives multiple coalition formation requests, it considers two factors of expected increase in its cooperative credit based on information it received from the leaders (e.g., UAV $70_1$) about required resources 20 for the tasks as well as its distance to the targets 80 in order to decide which coalition 70a to join. The coalition formation process is summarized in FIG. 7B, with reference to FIGS. 1 through 7A. Next, the cooperative communication method to relay a message from the target 80 to the base station 60 is described.

Amplify-and-Forward (AF) is a widely used relaying method in communication networks due to its simplicity and low-complexity. Beamforming is a technique based on AF relaying, where a set of relay nodes amplify and shift the phase of a transmitter's signal and rebroadcast it such that they add up constructively, while interfering signals add up destructively. In order to relay the message from the target 80 to the ground or base station 60, a beamforming scenario is provided in which each UAV in the coalition 70a multiplies the received target's signal to a complex weight number and rebroadcasts it (e.g., AF relaying). A common assumption of knowledge of Channel State Information (CSI) in the system 10 is followed in this technique. It is assumed that $$\underline{h}_{TU} = \left[h_{TU_0}, h_{TU_1}, \ldots, h_{TU_{N_S}}\right]^T$$

is the vector of instantaneous channel coefficients between the target and the coalition members, where $N_S=|S|-1$. Likewise, $$\underline{h}_{UB} = \left[h_{U_0 B}, h_{U_1 B}, \ldots, h_{U_{N_S} B}\right]^T \text{ is}$$

the vector of channel coefficients between the coalition members and the base station 60. Here, the index 0 represents the leader and the indices $i=1, 2, \ldots, N_S$ represent the members of the coalition 70a. It is assumed that the leader (e.g., UAV $70_1$) has the knowledge of instantaneous reciprocal channel vectors; i.e., $h_{TU}$ and $h_{UB}$) and is responsible for calculating the optimum beamforming and notifying the members of its coalition 70a.

If $S_T$ denotes the transmit signal, the vector of the received signal at the coalition can be written as:

$$\underline{x} = \underline{h}_{TU} s_T + \underline{n} \quad (1)$$

where $\underline{n} \sim \mathcal{N}(\underline{0}, \Sigma^{1/2})$, with diagonal covariance matrix $\Sigma$, is an additive zero mean Gaussian noise vector at the coalition members. It is assumed that each UAV $70_1 \ldots 70_x$ is aware of its local noise characteristics and performs the whitening transformation process before the beamforming. Hence, the whitened received signal at the UAVs $70_1 \ldots 70_x$ can be written as:

$$\tilde{\underline{x}} = \underline{\Sigma}^{-1/2}\underline{x} = \underline{\Sigma}^{-1/2}\underline{h}_{TU}s_T + \underline{\Sigma}^{-1/2}\underline{n}, \quad (2)$$

The $i^{th}$ coalition member, $i=0, 1, \ldots, N_S$, multiplies the received target signal by a complex weight $w_i^*$ and then relays it. The broadcasted signal by the members of the coalition $70a$ can be written as follows, assuming $\underline{w} = [w_0, w_1, \ldots, w_{N_s}]^T$:

$$\underline{t} = \underline{W}^H\tilde{\underline{x}} = \underline{W}^H\underline{\Sigma}^{-1/2}\underline{h}_{TU}s_T + \underline{W}^H\underline{\Sigma}^{-1/2}\underline{n} \quad (3)$$

where $\underline{W} = \text{diag}(\underline{w})$. The received signal at the base station 60 is:

$$y_B = \underline{h}_{UB}^H \underline{W}^H \sum\nolimits^{-1/2} \underline{h}_{TU} s_T + \underline{h}_{UB}^H \underline{W}^H \sum\nolimits^{-1/2} \underline{n} + v \quad (4)$$

$$= \underline{w}^H H_{UB}^H \sum\nolimits^{-1/2} \underline{h}_{TU} s_T + \underline{w}^H H_{UB}^H \sum\nolimits^{-1/2} \underline{n} + v$$

where, $\underline{H}_{UB} = \text{diag}(\underline{h}_{UB})$ and $v \sim \mathcal{N}M(0, \sigma^2)$ is white Gaussian noise at the base station receiver. Therefore, the Signal-to-Noise Ratio (SNR) at the base station 60 can be expressed by:

$$SNR_B = \frac{\underline{w}^H \underline{k}\underline{k}^H \underline{w}}{\underline{w}^H H_{UB}^H H_{UB} \underline{w} + \sigma^2}, \quad (5)$$

where $\underline{k} = \underline{H}_{UB}^H \Sigma^{-1/2} \underline{h}_{TU}$. Each UAV $70_1 \ldots 70_x$ (including the leader UAV $70_1$) has a limited energy to forward the target's signal. Using Equation (3), the power consumption at each member of the coalition $70a$ for relaying the target's signal can be written as:

$$P_{i,R} = [\underline{w}^H]_i [\underline{\Sigma}^{-1/2}]_{i,i} [\underline{h}_{TU}]_i [\underline{h}_{TU}^H]_i [\underline{\Sigma}^{-1/2}]_{i,i} [\underline{w}]_i + [\underline{w}^H]_i [\underline{w}]_i \quad (6)$$

where $i=0, 1, 2, \ldots, N_S$. It is assumed that the individual transmission power of UAV i is below a certain threshold, denoted by $p_i^{max}$.

To monitor the cooperative behavior of the UAVs $70_1 \ldots 70_x$, a cumulative cooperative credit is defined for each UAV $70_1 \ldots 70_x$ based on the amount of resources $50_1 \ldots 50_x$ that it utilizes for a specific task. It is assumed that the credit of all UAVs $70_1 \ldots 70_x$ are initialized to an equal initial credit $C_i^{(0)} = C > 0$, $i=1, 2, \ldots, N$. After completing a task, each UAV's credit is calculated using the following steps:

First, the credit of UAV i at time n is updated as:

$$\tilde{C}_i^{(n)} = \begin{cases} C_i^{(n-1)} + \Delta C_i^{(n)} & \text{If } \exists k | U_i \in S_k, \\ C_i^{(n-1)} & \text{Otherwise} \end{cases} \quad (7)$$

Here, the change in credit $C_i^{(n)}$ is defined by:

$$\Delta C_i^{(n)} = \frac{\tau_k}{\sum_{l \in S_k} a_l} a_i \quad (8)$$

where $\tau_k = \sum_{j=1}^{N_r} \tau_k^j$ represents a value of task k and $$a_i = \sum\nolimits_{j=1}^{N_r} \gamma_1 \left( \frac{r_i^j}{\tau_k^j} \right)$$

denotes the effective resource contribution of each UAV $70_1 \ldots 70_x$.

Second, if all $\tilde{C}_i^{(n)}$ for $I=1, 2, \ldots, N$ are equal, then the process sets $C_i^{(n)} = C$ to reset the credits. Otherwise:

$$C_i^{(n)} = C \frac{\tilde{C}_i^{(n)} - \tilde{C}_{min}}{\tilde{C}_{max} - \tilde{C}_{min}} \quad (9)$$

where $\tilde{C}_{max} = \max_{i=1, 2, \ldots, N} \{\tilde{C}_i^{(n)}\}$ and $\tilde{C}_{min} = \min_{i=1, 2, \ldots, N} \{\tilde{C}_i^{(n)}\}$.

Therefore, the credits in each step are scaled to values within $[0,C]$ range. After the completion of each task, the updated credits are broadcasted by the coalition leader (e.g., UAV $70_1$) to be used for future coalition formations. For the sake of simplicity, the superscripts (n) are dropped hereafter.

In the coalition formation method provided by the embodiments herein, first the leaders (e.g., UAV $70_1$) select their coalition members (e.g., UAVs $70a$) among the available candidates (e.g., UAV $70_1 \ldots 70_x$) to maximize their corresponding coalition's utility function to enhance the efficiency in completing their encountered task noting the resource constraints. The coalition value for the $k^{th}$ leader is defined in such a way to: i) assure the existence of required resources 20 to handle a task, ii) avoid over-spending the resources 50 on a specific task, iii) guarantee the timely completion of the task, iv) provide the required quality of communication to relay target's message, and also v) select the reliable UAVs as follows:

$$v|(S_k) = \alpha_1 \sum\nolimits_{i=1}^{N_S} C_i + \alpha_2 \gamma_{(-L)}\left(\frac{SNR_{Thr}}{SNR_{S_k}}\right) + \quad (10)$$

$$\alpha_3 \sum\nolimits_{j=1}^{N_r} \gamma - L\left(\frac{R_k^j}{\tau_k^j}\right) - \gamma_L\left(\frac{\max_i |U_i \in S_k \{\delta_{i,k}\}}{f_\delta(\rho)}\right)$$

for a large enough positive value of L. Here, the design parameters $\alpha_1$, $\alpha_2$, and $\alpha_3 > 0$ represent the importance of the credit and quality of communication compared to the resource optimization goal for the leader UAV $70_1$. Also, $SNR_{Thr}$ represents the minimum required $SNR_{S_k}$ to successfully relay the target's message to the base station 60. The maximum function in the last term of Equation (10) is used to ensure that even the UAV with the latest time of arrival will be at task position in time. The $k^{th}$ leader is a member of the coalition $S_k$.

In order to find the optimal coalition which maximizes the leader's utility function in Equation (10), a search over all $2^{L_k}$ possible coalitions is utilized, where $L_k$ denotes the number of potential follower UAVs who responded to the proposal of leader k. To avoid such extensive search, a low complexity merge-and-split technique is provided. In this method, each leader k separately starts from an initial state where the set of UAVs who responded to its proposal is partitioned into $L_k$ singleton coalitions. Afterward, in each step, two chosen coalitions $S_{ki}$ and $S_{kj}$ are merged if $v(S_{ki} \cup S_{kj}) > v(S_{ki}) + v(S_{kj})$. Here, since the value of the coalitions $70a$ which does not include the leader (e.g., UAV $70_1$) is zero, the only possible merge happens if a singleton coalition {u} and the coalition $S_k$ which contains the $k^{th}$ leader satisfy the condition $v(S_k \cup \{u\}) > v(S_k)$. Also, if for a non-singleton coalition S there exists a partition of two coalitions $S_{ki}$ and $S_{kj}$ such that $v(S=S_{ki} \cup S_{kj}) < v(S_{ki}) + v(S_{kj})$, then S splits into $S_{ki}$ and $S_{kj}$, whereby each leader considers itself as a constant member of all coalitions under evaluation. At each step of the merge-and-split process, the optimum value of the $SNR_B$ in the utility function of Equation (10) for the coalitions may be calculated, as further described below. The merge-and-split process is used to obtain a suboptimal coalition solution of Equation (10) with lower complexity. When the changes in coalition values over consequent rounds become below a threshold, the coalition with highest coalition value would be selected from the leader's perspective and the members (e.g., UAVs $70_1 \ldots 70_x$) are notified.

The coalition formation process may comprise:

As such, in order to show the stability of the process, it is sufficient to show that: i) the number of sequential rounds of the process is finite, and ii) each merge-and-split stage is stable. The first is ensured, because at each round, the members with no interest in joining the formed coalition 70a are excluded, and therefore after at most $m_s$ iterations the process stops, where $m_s$ is the number of UAVs with a negative response to join a coalition 70a. The second condition is also satisfied since the formed coalitions by the leaders (e.g., UAV $70_1$) are $D_{hp}$-stable. This is due to the fact that the only type of allowed membership changes are based on single or possibly multiple merge-and-splits (i.e., a UAV or a group of them are only allowed to leave a partition by means of merges or splitting).

The optimization from the leaders' perspective is to maximize the coalition value in Equation (10) by searching over the coalitions (i.e., S) and determine the optimum beamforming scheme; i.e., w to optimize $SNR_B$. For each

```
 1: Initializing coalitions      ▷ Each leader k starts
    from a partition of the singleton coalitions of UAVs who responded to its proposal
 2: Merge-and-split coalition formation algorithm by the leader   ▷ for all available
    UAVs for this task
 3: while Change in coalition values is greater than ∈ do
 4:   while S_i and S_j exist with υ(S_i ∪ S_j) > υ(S_i) + υ(S_j) do
 5:     Merge S_i and S_j.
 6:   end while
 7:   while S_i and S_j exist such that: υ(S = S_i ∪ S_j) < υ(S_i) + υ(S_j) do
 8:     Split S into partitions S_i and S_j.
 9:   end while
10:   if  There is a split then
11:     go to 4.
12:   end if
13: end while
14: Select the coalition with highest coalition value, notify the UAVs of this selected
    coalition
15: if All selected potential followers said Yes then
16:   Terminate
17: else
18:   Exclude the ones with No response, go to 3
19: end if
20: Selecting the best formation request from different leaders by each selected
    follower
21: if Received only one formation request then
22:   Say Yes to that leader
23: else
24:   Say Yes to the leader of coalition that maximizes Equation (11),
      say No to other leaders
25: end if
```

When the optimal coalitions from the leaders' perspective are formed, the formation requests will be sent out to the selected UAVs. If a potential follower receives multiple requests from different leaders, it prefers to join the coalition which benefits it the most. The utility function of the followers is defined as:

$$v_p(U_i, S_k) = \Delta C_i - \alpha_4 \delta_{i,k}, \quad (11)$$

where $\Delta C_i$ and $\delta_{i,k}$ are the expected credit (knowing the required resources for the encountered task) and traveling time to task k if user $U_i$ joins the coalition $S_k$, respectively. Here, $\alpha_4$ is a design parameter that indicates the importance of the traveling cost compared to the change in credit.

The coalition formation process includes a series of merge-and-split coalition formation steps. After each stage of merge-and-split coalition formation, the leader (e.g., UAV $70_1$) sends out the requests 55 and collects the followers' responses. If all responses are affirmative, the coalition formation process stops; otherwise, a new merge-and-split is executed that keeps the current members with positive responses, and evaluates the new available UAVs.

coalition, the optimal value of Equation (5), $SNR_S^{opt}$ can be obtained via the following inner optimization problem:

$$\max_{\underline{w}} \frac{\underline{w}^H \underline{k}\underline{k}^H \underline{w}}{\underline{w}^H H_{UB}^H H_{UB} \underline{w} + \sigma^2} \quad (12)$$

$$[\underline{w}^H]_i \left( \left[\sum\right]^{-1/2}_{i,i} [\underline{h}_{TU}]_i [\underline{h}_{TU}^H]_i \left[\sum\right]^{-1/2}_{i,i} + 1 \right)[\underline{w}]_i \leq P_i^{max},$$

$$i = 0, 1, \ldots, N_c$$

A bisection method may be used to solve the fractional Quadratically Constrained Quadratic Program (QCQP)s such as the optimization problem in Equation (12) that can be rewritten as:

$$\max_{\underline{w},t} t \quad (13)$$

$$[\underline{w}^H]_i \left( [\sum^{-1/2}]_{i,i} [\underline{h}_{TU}]_i [\underline{h}_{TU}^H]_i [\sum^{-1/2}]_{i,i} + 1 \right) [\underline{w}]_i \leq P_i^{max},$$

$$i = 0, 1, \ldots, N_c$$

$$\underline{w}^H \underline{k}\underline{k}^H \underline{w} \geq t\underline{w}^H \underline{H}_{UB}^H \underline{H}_{UB} \underline{w} + t\sigma^2,$$

where t is an auxiliary variable. In the bisection method, given the value of $t \geq 0$, the following feasibility check problem is investigated:

$$\text{Find } w \; [\underline{w}_H]_i ([\Sigma^{-1/2}]_{i,i} [\underline{h}_{TU}]_i [\underline{h}_{TU}^H]_i [\Sigma^{-1/2}]_{i,i} + 1) [$$
$$\underline{w}]_i \leq P_i^{max}, i = 0, 1, \ldots, N_c \underline{w}^H \underline{k}\underline{k}^H \underline{w} \geq t\underline{w}^H \underline{H}_{UB}^H \underline{H}_{UB}$$
$$\underline{w} + t\sigma^2. \quad (14)$$

If the problem described in Equation (14) is feasible, then the optimal solution of the problem in Equation (13); i.e., $SNR_S^{opt}$, is less than or equal to t; otherwise $SNR_S^{opt} \geq t$. The variable t is up limited by $t^{up}$ which is obtained in the following Lemma:

Lemma: $t^{up} = \underline{k}^H Q^{-1} \underline{k}$ is an up limit for objective in optimization problem Equation (12). The optimization problem becomes feasible if and only if the matrix $\underline{k}\underline{k}^H - t\underline{H}_{UB}^H \underline{H}_{UB}$ is non-negative definite. Since the matrix $Q = \underline{H}_{UB}^H \underline{H}_{UB}$ is positive semi-definite, the matrix $Q^{-1/2}(\underline{k}\underline{k}^H - t\underline{H}_{UB}^H \underline{H}_{UB})$ $Q^{-1/2} = Q^{-1/2}\underline{k}\underline{k}^H Q^{-1/2} - tI$ must be non-negative definite. That results in $t \leq \lambda_{max}(Q^{-1/2}\underline{k}\underline{k}^H Q^{-1/2}) = \underline{k}^H Q^{-1} \underline{k}$.

Using the above Lemma and by assuming $\delta$ as the absolute precision of the final objective function value, the iteration's complexity order of the bisection method can be written as $$O\left(\log\left(\frac{t^{up}}{\sigma}\right)\right).$$

The feasibility problem of Equation (14) can be solved using the Semi-Definite Programming (SDP) relaxation method. One point to notice is whether $\underline{w}^{opt}$ is an optimal solution to the feasibility problem of Equation (14), then for any arbitrary real number $\theta$, $\tilde{\underline{w}} = \underline{w}^{opt} e^{j<\theta}$ is also an optimal solution. Therefore, it is possible to assume that $\underline{w}^H \underline{H}_{UB} \Sigma^{-1/2} \underline{h}_{TU}$ is a non-negative real number. By considering this constraint, the feasibility problem of Equation (14) can be rewritten as the following SOCP problem for a given $t \geq 0$:

$$\text{Find } \underline{w}[\underline{w}^H]_i ([\Sigma^{-1/2}]_{i,i} [\underline{h}_{TU}]_i [\underline{h}_{TU}^H]_i [\Sigma^{-1/2}]_{i,i} + 1)[$$
$$\underline{w}]_i \leq P_i^{max}, i = 0, 1, \ldots, N_c \underline{w}^H \underline{k} \geq$$
$$\sqrt{t\underline{w}^H \underline{H}_{UB}^H \underline{H}_{UB} \underline{w} + t\sigma^2} \; \mathcal{R} \; \{\underline{w}^H \underline{H}_{UB}^H \Sigma^{-1/2}$$
$$\underline{h}_{TU}\} \geq 0 I\{\underline{w}^H \underline{H}_{UB}^H \Sigma^{-1/2} | \underline{h}_{TU}\} = 0. \quad (15)$$

The feasibility check problem in Equation (15) can be effectively solved using the cvx convex optimization toolbox. By considering the cubic complexity order of the SOCP method, the complexity order of the communication optimization can be expressed as $$\left(|S|^3 \log\left(\frac{t^{up}}{\delta}\right)\right).$$

FIGS. 8A through 8E, with reference to FIGS. 1 through 7B, illustrates an example system 100 to identify, by a first UAV $70_1$, a combination of UAVs $70_1 \ldots 70_x$ to execute a mission 25. Processor 45 may include a central processing unit, microprocessors, microcontroller, hardware engines, and/or other hardware devices suitable for retrieval and execution of computer-executable instructions 115, 120, 125, 130, 135, 140, 145, 150, 155, 160, 165, 170, 175, and 180 stored in a machine-readable storage medium 110.

Processor 45 may fetch, decode, and execute computer-executable instructions 115, 120, 125, 130, 135, 140, 145, 150, 155, 160, 165, 170, 175, and 180 to enable execution of locally-hosted applications for controlling action of the first UAV $70_1$. As an alternative or in addition to retrieving and executing instructions, processor 45 may include one or more electronic circuits including a number of electronic components for performing the functionality of one or more of the instructions 115, 120, 125, 130, 135, 140, 145, 150, 155, 160, 165, 170, 175, and 180.

The machine-readable storage medium 110 may be any electronic, magnetic, optical, or other physical storage device that stores computer-executable instructions 115, 120, 125, 130, 135, 140, 145, 150, 155, 160, 165, 170, 175, and 180. Thus, the machine-readable storage medium 110 may be, for example, Random Access Memory, an Electrically-Erasable Programmable Read-Only Memory, volatile memory, non-volatile memory, flash memory, a storage drive (e.g., a hard drive), a solid-state drive, optical drive, any type of storage disc (e.g., a compact disc, a DVD, etc.), and the like, or a combination thereof. In one example, the machine-readable storage medium 110 may include a non-transitory computer-readable storage medium.

Figure 8A:
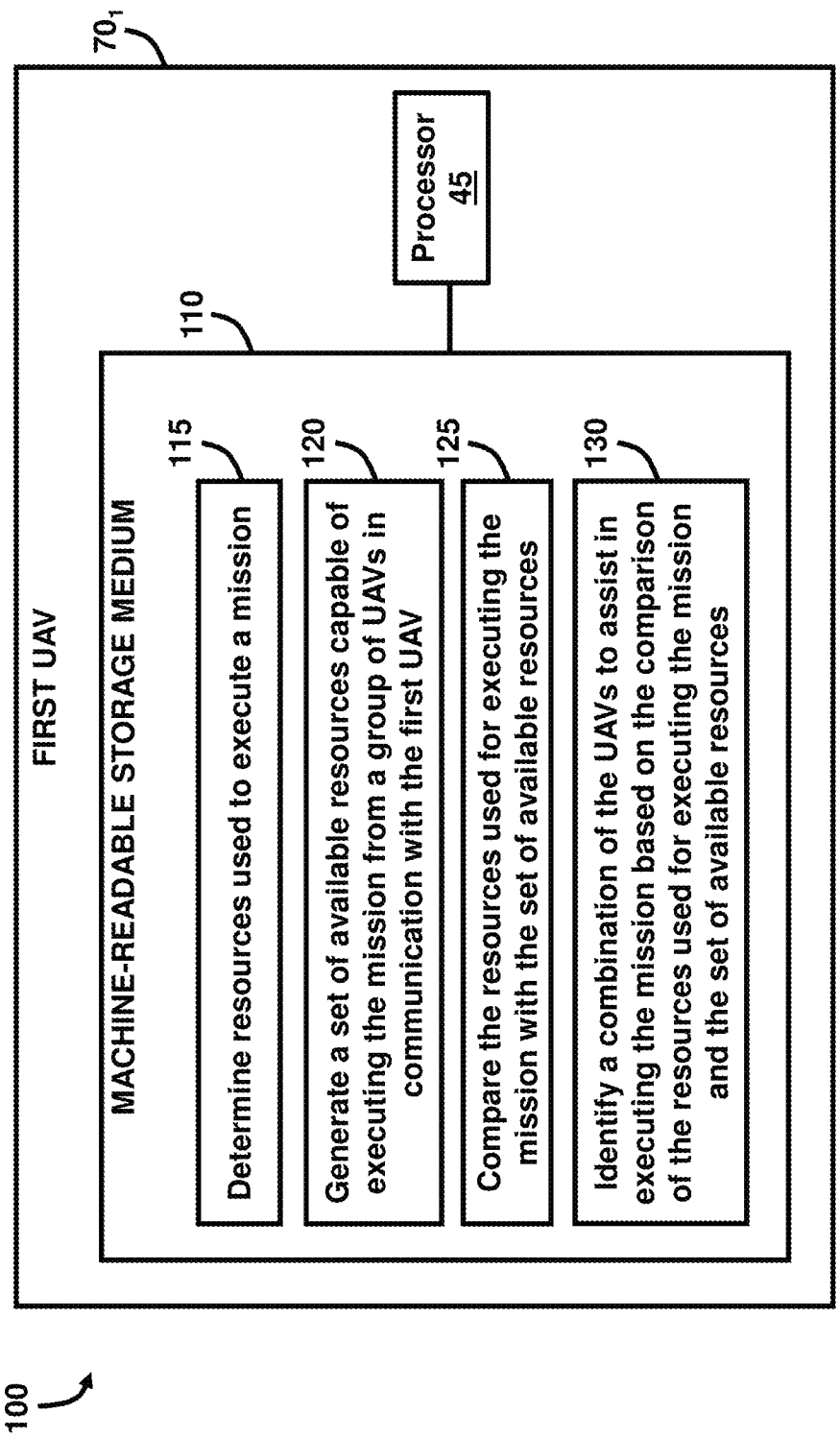
FIG. 8A is a block diagram illustrating a system for executing a mission, according to an embodiment herein.

In an example, the processor 45 of the first UAV $70_1$ executes the computer-executable instructions 115, 120, 125, 130, 135, 140, 145, 150, 155, 160, 165, 170, 175, and 180. In FIG. 8A, the determining instructions 115 may determine resources 20 used to execute a mission 25. These resources 20 may be the minimal amount or type of resources necessary to execute the mission 25. Moreover, the mission 25 may be a predefined mission or may be a dynamic mission that changes in real-time. The generating instructions 120 may generate a set of available resources 50 capable of executing the mission 25 from a group of UAVs $70_1 \ldots 70_x$ in communication with the first UAV $70_1$. The communication from amongst the group of UAVs $70_1 \ldots 70_x$ may occur using any type of communication system and through any type of communication network. In an example, the communication between the group of UAVs $70_1 \ldots 70_x$ may occur directly and without any intermediary or centralized base station 60. The set of available resources 50 capable of executing the mission 25 may include any combination of resources available from the UAVs $70_1 \ldots 70_x$ including the first UAV $70_1$. The comparing instructions 125 may compare the resources 20 used for executing the mission 25 with the set of available resources 50. The comparison of the resources 20 that are necessary to execute the mission 25 and the set of available resources 50 may occur in real-time, according to an example, as any of the resources 20 and the set of available resources 50 changes due to updates or changes to the requirements for performing the mission 25, and the status or availability of the available resources 50 due to the exhaustion of the available resources 50 overtime. The identifying instructions 130 may identify a combination of the UAVs 70a to assist in executing the mission 25 based on the comparison of the resources 20 used for executing the mission 25 and the set of available resources 50. The combination of the UAVs 70a may include any suitable combination of the UAVs $70_1 \ldots 70_x$ including the first UAV $70_1$.

In FIG. 8B, the identifying instructions 135 may identify the group of UAVs $70_1 \ldots 70_x$, which are available in the coalition and which are in communication with at least the first UAV $70_1$. The group of UAVs $70_1 \ldots 70_x$ may be geographically dispersed in any location(s), and the identifying instructions 135 utilize the inter-communication between the group of UAVs $70_1 \ldots 70_x$ to identify the coalition of UAVs $70_1 \ldots 70_x$ that may potentially assist in executing the mission 25. Transmitting instructions 140 may transmit a request (e.g., message 55) to the group of UAVs $70_1 \ldots 70_x$ to send to the first UAV $70_1$ the available resources 50 for each of the UAVs $70_1 \ldots 70_x$ in order to generate the set of available resources 50 capable of executing the mission 25. The first UAV $70_1$ determines what the available resources 50 are of the group of UAVs $70_1 \ldots 70_x$ to consider whether the mission 25 can be executed based on the resources 20 that are necessary to execute the mission 25. Generating instructions 145 may generate the set of available resources 50 capable of executing the mission 25 based on an assessment of which combination of the available resources 50 from the group of UAVs $70_1 \ldots 70_x$ best maximizes an efficiency in executing the mission 25. According to an example, the first UAV $70_1$ may consider many factors in assembling a team from amongst the group of UAVs $70_1 \ldots 70_x$ to execute the mission 25, and one such factor may be to consider how efficiently the mission 25 may be executed if performed by a particular combination of available resources 50 from a particular combination of the group of UAVs $70_1 \ldots 70_x$.

Figure 8C:
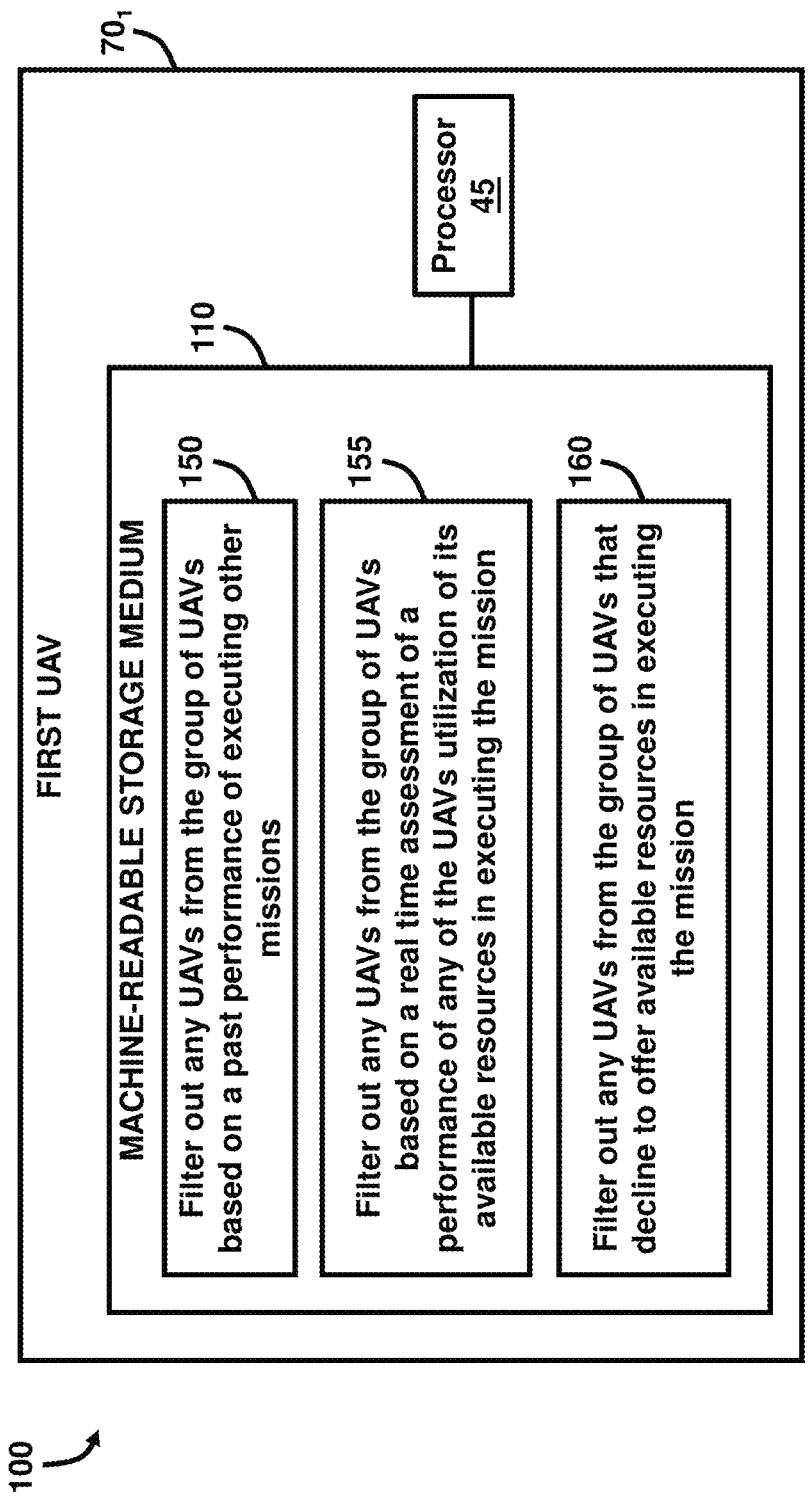
FIG. 8C is a block diagram illustrating a system for filtering out the selection of UAVs from a group of UAVs based on different factors, according to an embodiment herein.

As shown in FIG. 8C, the filtering instructions 150 may filter out any UAVs 71 from the group of UAVs $70_1 \ldots 70_x$ based on a past performance of executing other missions 25a. In this regard, filtering out may refer to removing the UAVs 71 from consideration for executing the mission 25. One factor in considering which of the UAVs 71, if any, to remove from consideration (i.e., filtering out) is the performance of UAVs $70_1 \ldots 70_x$ in executing other missions 25a. Accordingly, if the UAVs 71 did not perform to a predetermined standard on another mission 25a or did not execute the mission 25a, then the filtering instructions 150 considers this in its analysis. Filtering instructions 155 may filter out any UAVs 71 from the group of UAVs $70_1 \ldots 70_x$ based on a real-time assessment of a performance of any of the UAVs' 71 utilization of its available resources 51 in executing the mission 25. In this regard, the UAVs 71 may be removed from consideration for executing the mission 25 if the real-time performance of the UAVs 71 in executing the mission 25 is below a predefined standard. In this regard, even if the UAVs 71 were initially selected to execute the mission 25, the real-time performance assessment may result in removal of the UAVs 71 from continuing in performing the mission 25. For example, while on route to performing the mission 25, the UAVs 71 may experience a technical failure in payload delivery or guidance system malfunction, or any other deterioration or impedance of utilizing its available resources 51, and thus the filtering instructions 155 may determine that these UAVs 71 are no longer practical for executing the mission 25, and thus are removed from consideration (i.e., filtered out) for continuing with the mission 25. Filtering instructions 160 may filter out any UAVs 71 from the group of UAVs $70_1 \ldots 70_x$ that decline to offer its available resources 51 in executing the mission 25. Each of the UAVs $70_1 \ldots 70_x$ may be autonomous (i.e., not controlled by any other system or device), and therefore any of the UAVs $70_1 \ldots 70_x$ may determine that it will not execute the mission 25 or provide its available resources 51, and thus such UAVs 71 are removed from consideration (i.e., filtered out) for performing the mission 25.

Figure 8D:
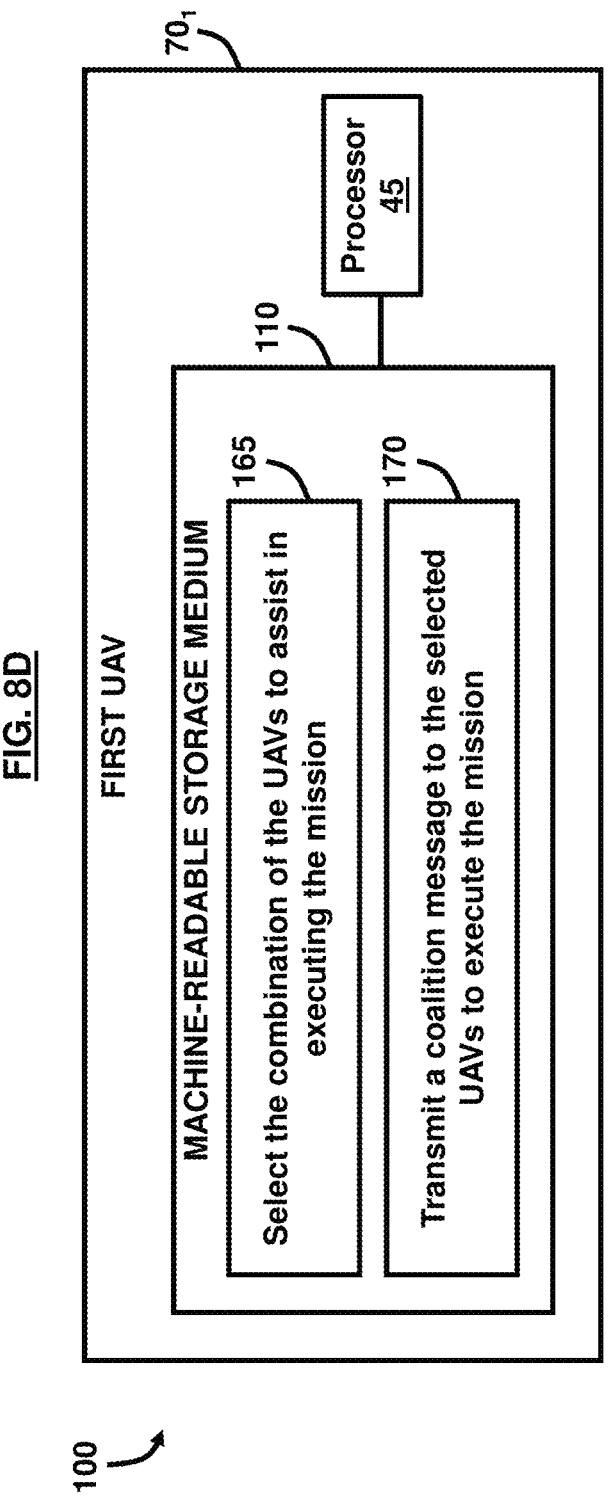
FIG. 8D is a block diagram illustrating a system for selecting a combination of UAVs to execute a mission and communicating with the selected UAVs, according to an embodiment herein.

In FIG. 8D, the selecting instructions 165 may select the combination of the UAVs 70a to assist in executing the mission 25. Once the available resources 50 are compared with the necessary resources 20 to complete the mission 25, the combination of UAVs 70a that are capable of completing the mission 25 is selected. In an example, the first UAV $70_1$ performs the selection process. The transmitting instructions 170 may transmit a coalition message 55 to the selected UAVs 70a to execute the mission 25. In an example, the first UAV $70_1$ transmits the message 55 to the selected UAVs 70a either separate to each of the UAVs 70a or collectively to the group of UAVs $70_1 \ldots 70_x$.

Figure 8E:
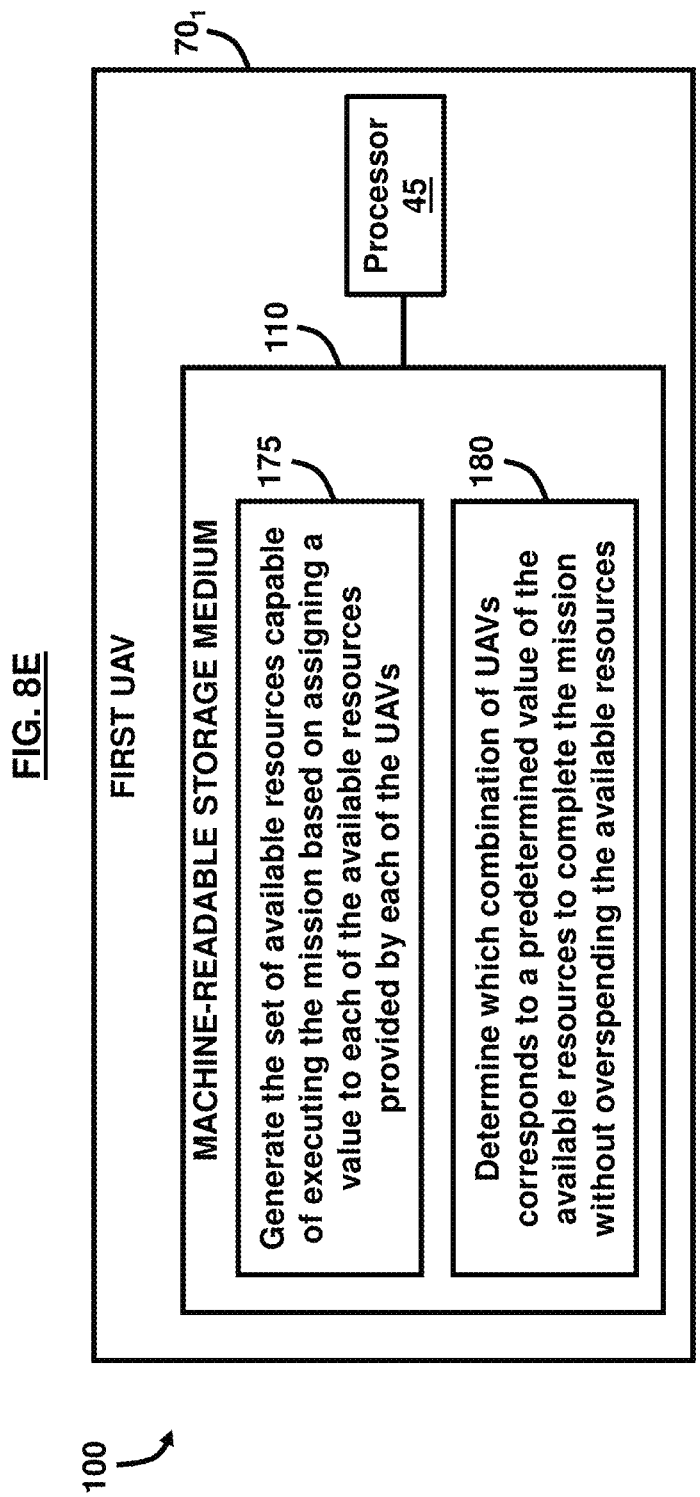
FIG. 8E is a block diagram illustrating a system for generating a set of available resources to execute a mission and determining a combination of UAVs with the resources to execute the mission, according to an embodiment herein.

As indicated in FIG. 8E, the generating instructions 175 may generate the set of available resources 50 capable of executing the mission 25 based on assigning a predetermined value to each of the available resources 50 provided by each of the UAVs $70_1 \ldots 70_x$. In this regard, the predetermined value may be any of a qualitative and quantitative value of importance, necessity, or efficiency with regard to the available resources 50 capable of executing the mission 25. This predetermined value is used to select the UAVs 70a to execute the mission 25 by determining which of the group of UAVs $70_1 \ldots 70_x$ has the requisite combination of available resources 50 to execute the mission 25. The determining instructions 180 may determine which combination of UAVs 70a corresponds to the predetermined value of the available resources 50 to complete the mission 25 without overspending the available resources 50. This allows for the efficient utilizing of the available resources 50 from amongst the group of UAVs $70_1 \ldots 70_x$. Accordingly, the overspending of the available resources 50 may involve duplicating or overusing the available resources 50 for executing the mission 25. In an example, the predetermined value may be the highest value or the optimum value attributed to the available resources 50 by the processor 45. In other examples, the predetermined value may be the lowest value or may be set to any suitable threshold or scale.

FIGS. 9A through 9D, with reference to FIGS. 1 through 8E, are flow diagrams illustrating a method 200 of autonomously assessing a cooperative performance of a task (i.e., mission 25). The problem of cooperative task completion in a network 75 of heterogeneous UAVs $70_1 \ldots 70_x$ with constrained individual resources in considered for implementing the method 200, according to an example. It may be assumed that a number of targets 80 are distributed in an unknown environment, where no prior information about the targets' time of appearance and location is available. It may also be assumed that there is one compound task (i.e., mission 25) associated with each target 80. The tasks (i.e., missions 25) can differ intrinsically based on the characteristics of their encountered targets 80 in terms of mobility, speed, position, and the required resources 20. For example, prosecution of a fighter tank or a long-range missile in a battlefield require different sets of equipment and resources 20. The objectives of the method 200 include: i) locating the distributed targets 80, ii) identifying their associated tasks (i.e., missions 25) and required resources 20, and iii) completing the identified tasks (i.e., missions 25). In order to accomplish these objectives, the method 200 forms one or more coalitions of UAVs 70a using the above-described coalition formation method, in which each coalition will complete a task (i.e., mission 25) associated to one target 80. The coalition formation technique provided by the embodiments herein with a leader-follower structure is configured to ensure providing adequate resources 50 to complete each encountered task (i.e., mission 25) while not exceeding, or at the very least, minimally exceeding the minimum required resources 20. The dynamic coalition formation technique implemented by method 200 enables the UAVs $70_1 \ldots 70_x$ to overcome the limitations of their individual capabilities such as limited payload and computation, and communication resources. The formation of a coalition(s) of UAVs 70a can also extend the coverage area in target tracking and surveillance applications compared to utilizing individual UAVs only. The traveling distances of the UAVs $70_1 \ldots 70_x$ to the tasks (i.e., missions 25) are also taken into account in forming optimal coalitions of UAVs 70a to complete the tasks (i.e., missions 25) in a timely manner. Furthermore, in order to get more detailed information about the identified targets 80 (e.g., an adversary object in a battlefield, etc.), each coalition of UAVs 70a may forward the broadcast messages by their encountered target 80 to a base station 60 using a beamforming technique.

The method 200 in FIG. 9A comprises operating (205) a first UAV $70_1$ to search for a target 80. The searching may occur by the first UAV $70_1$ moving towards the target 80 or by the first UAV $70_1$ using signal detection to locate the target 80 while the first UAV $70_1$ is in a hovering state of operation. Upon locating the target, the method 200 comprises assessing (210) a requirement for the first UAV $70_1$ to perform the task (i.e., mission 25) relating to the target 80. In this regard, the task (i.e., mission 25) may require some action related to the target 80. Next, the method 200 comprises transmitting (215) a first electronic message $85_1$ to other UAVs $70_2 \ldots 70_x$ capable of assisting the first UAV $70_1$ in performing the task (i.e., mission 25). The first electronic message $85_1$ may be transmitted directly from the first UAV $70_1$ to the other UAVs $70_2 \ldots 70_x$ or through a base station 60. Furthermore, the first electronic message $85_1$ may comprise any of wired or wireless communications, and the first electronic message $85_1$ may be encrypted. Thereafter, the method 200 may comprise receiving (220) at least one second electronic message $85_2$ from the other UAVs $70_2 \ldots 70_x$ identifying available resources 50 from each of the other UAVs $70_2 \ldots 70_x$ to perform the task (i.e., mission 25). The second electronic message $85_2$ may be transmitted directly to the first UAV $70_1$ from the other UAVs $70_2 \ldots 70_x$ or through a base station 60. Furthermore, the second electronic message $85_2$ may comprise any of wired or wireless communications, and the second electronic message $85_2$ may be encrypted. Upon completion of this, the method 200 comprises determining (225) which combination of the other UAVs $70_2 \ldots 70_x$ is best capable of assisting the first UAV $70_1$ in performing the task (i.e., mission 25) based on a predefined criterion. In an example, the first UAV $70_1$ may not join in performing the task (i.e., mission 25). According to some examples, the predefined criterion may be changed based on the dynamic nature of the required task (i.e., whether the mission 25 changes after determining (225) which combination of the other UAVs $70_2 \ldots 70_x$ is best capable of assisting the first UAV $70_1$ in performing the task, etc.). Other predefined criterion are described further below with reference to FIG. 9D.

As shown in FIG. 9B, the method 200 may further comprise selecting (230) the combination of the other UAVs $70_2 \ldots 70_x$ that is best capable of assisting the first UAV $70_1$ in performing the task (i.e., mission 25). Accordingly, the coalition formation involves selecting the other UAVs $70_2 \ldots 70_x$ to establish the coalition of UAVs 70a. The method 200 further comprises transmitting (235) a third electronic message $85_3$ to the other UAVs $70_2 \ldots 70_x$ requesting the selected combination of the other UAVs $70_2 \ldots 70_x$ to assist the first UAV $70_1$ in performing the task (i.e., mission 25). Due to the autonomous configuration of each of the UAVs $70_1 \ldots 70_x$, the first UAV $70_1$ transmits the third electronic message $85_3$ to the other UAVs $70_2 \ldots 70_x$ requesting their assistance in performing the task (i.e., mission 25). The third electronic message $85_3$ may be transmitted directly from the first UAV $70_1$ to the other UAVs $70_2 \ldots 70_x$ or through a base station 60. Furthermore, the third electronic message $85_3$ may comprise any of wired or wireless communications, and the third electronic message $85_3$ may be encrypted.

As shown in FIG. 9C, the method 200 may further comprise performing (240) the task (i.e., mission 25) using the first UAV $70_1$ with the selected combination of the other UAVs $70_2 \ldots 70_x$. In another example, the coalition or combination of UAVs 70a performing the task (i.e., mission 25) may or may not include the first UAV $70_1$. As shown in FIG. 9D, the method 200 may further comprise selecting (245) the combination of the other UAVs $70_2 \ldots 70_x$ based on any of a time T required to perform the task (i.e., mission 25), resource allocation capable of being provided by the other UAVs $70_2 \ldots 70_x$, a trust factor associated with the other UAVs $70_2 \ldots 70_x$, and a likelihood of performance of the task (i.e., mission 25) based on the available resources 50 from each of the other UAVs $70_2 \ldots 70_x$.

In this regard, the first UAV $70_1$ may consider several of these predefined criterion, among others, to create the coalition or combination of UAVs 70a to perform the task (i.e., mission 25). The time T may be set based on a desired time established by the first UAV $70_1$, base station 60, or system programmer associated with the system 10. The resource allocation may include the available resources $50_2 \ldots 50_x$ associated with the other UAVs $70_2 \ldots 70_x$ as well as the available resources $50_1$ of the first UAV $70_1$ and what the optimum resource allocation is amongst the available resources $50_1 \ldots 50_x$ to satisfy the required or necessary resources 20 without overspending (i.e., overusing, duplication, or otherwise wasting) the available resources $50_1 \ldots 50_x$ or with only a minimal amount of overspending of the available resources $50_1 \ldots 50_x$. The trust factor may involve the reputation of the other UAVs $70_2 \ldots 70_x$, which may be based on their respective performance(s) on prior missions 25a, and the extent that the first UAV $70_1$ can trust that the other UAVs $70_2 \ldots 70_x$ will be able to perform the current task (i.e., mission 25). The likelihood of performance of the task (i.e., mission) may involve the first UAV $70_1$ determining that the task (i.e., mission 25) will likely be successfully accomplished based on the available resources $50_1 \ldots 50_x$ and a comparison to the required or necessary resources 20 for performing the task (i.e., mission 25).

Furthermore, each of the other UAVs $70_2 \ldots 70_x$ may comprise a different available resource $50_2 \ldots 50_x$ compared to one another to assist the first UAV $70_1$ in performing the task (i.e., mission 25). Alternatively, the other UAVs $70_2 \ldots 70_x$ may comprise the same or an overlapping set of available resource $50_2 \ldots 50_x$ compared to one another to assist the first UAV $70_1$ in performing the task (i.e., mission 25). Moreover, the first UAV $70_1$ may comprise available resources $50_1$ that are the same, different, or overlapping to the available resources $50_2 \ldots 50_x$ associated with any of the other UAVs $70_2 \ldots 70_x$.

In order to validate the performance of the method 200, a simulated experiment of two leader (i.e., two UAVs $70_1$) and six follower (i.e., six other UAVs $70_2 \ldots 70_x$) is considered. The UAVs $70_1 \ldots 70_x$ are uniformly located in a $\mathcal{R}^3$ region. It is assumed that the leaders (UAVs $70_1$) do not carry out the required resources 20 to perform the identified tasks (i.e., missions 25) individually and they call out to form coalitions of UAVs 70a. Five types of resources are considered and the amount of each resource at each UAV $70_1 \ldots 70_x$ as well as the required resources 20 for each task (i.e., mission 25) are generated randomly. The traveling time is generated proportional to the distance of the UAVs $70_1 \ldots 70_x$ to the corresponding target 80. All communication channels are generated by zero mean Gaussian variables with variance proportional to the inverse distance between the corresponding transmitter and receiver antennas.

Figure 10:
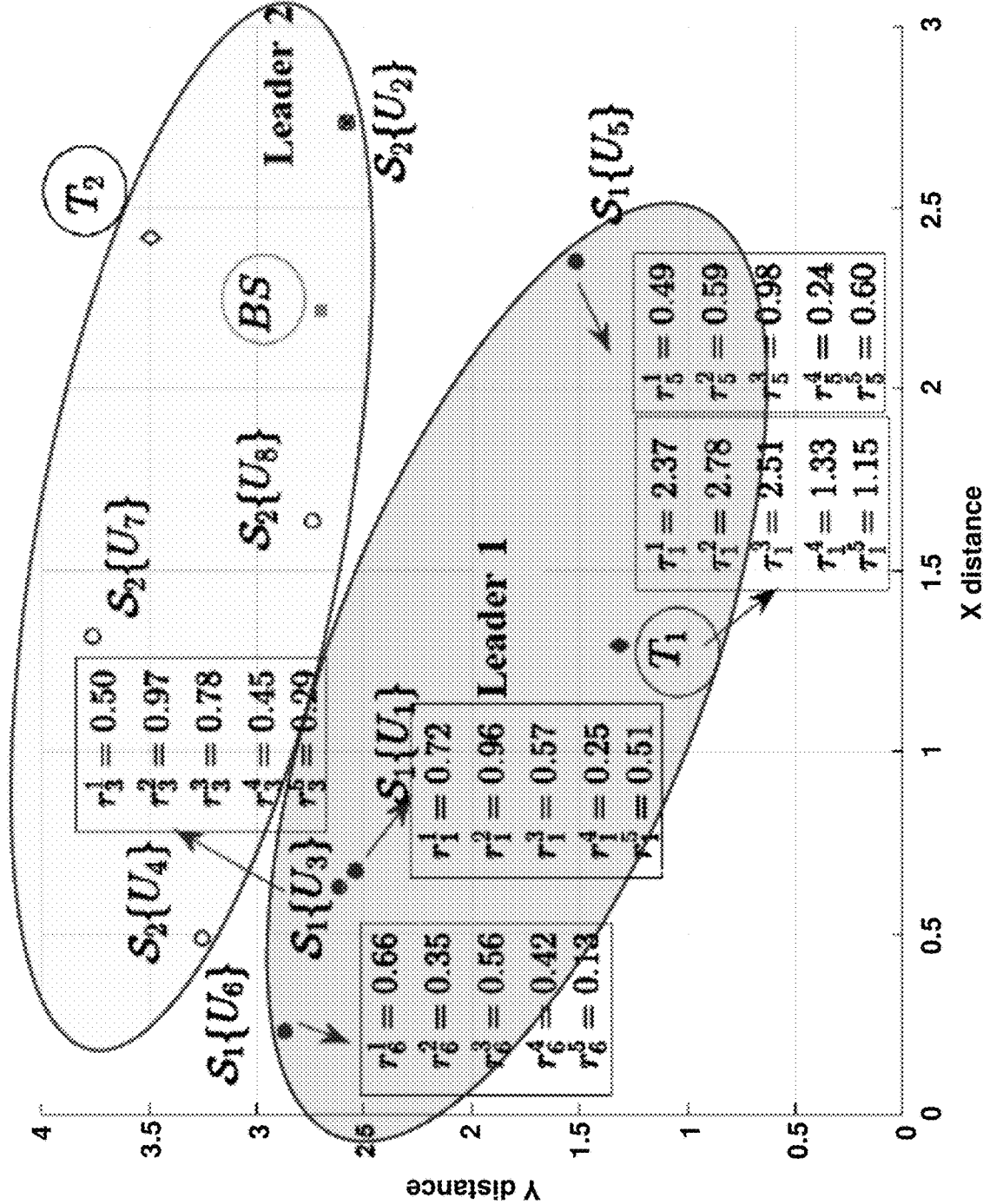
FIG. 10 is a graphical representation illustrating experimentally simulated stable formed coalitions used to complete two identified tasks with two leader and six follower UAVs, according to an embodiment herein.

FIG. 10, with reference to FIGS. 1 through 9D, demonstrates the positions of UAVs $70_1 \ldots 70_x$ in the network 75 and the formed coalitions of UAVs 70a in a numerical experiment. For this example, the stable formed coalitions are as $S_1=\{U_1, U_3, U_5, U_6\}$ and $S_2=\{U_2, U_4, U_7, U_8\}$, where coalitions $S_1$ and $S_2$ complete the tasks 1 and 2, respectively. In FIG. 10, the UAVs are shown by a notation of $S_i\{U_j\}$ that refers to the UAV number j is in coalition $S_i$. The method 200 is considered for different scenarios, where the stable coalitions are formed after a few rounds. The available resources in coalition $S_1$ provided by each UAV as well as the required resources to complete $T_1$ are listed in FIG. 10.

Table 1 shows the comparison of available resources in coalition $S_1$ versus the required resources to complete the task encountered by this coalition. As shown in Table 1, the summation of available resources in coalition $S_1$ are higher than the required resources for task 1 which guarantees that this task can be completed by the members of coalition $S_1$. Moreover, to evaluate the efficiency of the coalition formation method provided by the embodiments herein in a resource constraint network, an Efficiency Factor is defined as $E.F.=\sum_{j=1}^{N_r}\{\sum_{i\in S_1} r_i^j/\tau_1^j\}/N_r$. This factor evaluates the performance of the formed coalitions in terms of resource allocation efficiency, where the closer value of E.F. to 1 means the more efficient the method is in terms of not overspending the resources for a particular task. In an example, the average E.F. value is 1.11, which is fairly close to 1.

TABLE 1

Comparison of the Available Resources and the Required Resources in Coalition $S_1$

| Available resources in $S_1$ $\sum_{i\in S_1} r_i^j$ | Required resources for $T_1$ ($\tau_1^j$) | $\sum_{i\in S_1} r_i^j \geq \tau_1^j$ | $\sum_{i\in S_1} \dfrac{r_i^j}{\tau_1^j}$ |
|---|---|---|---|
| resource 1: 2.37 | 2.37 | ✓ | 1.00 |
| resource 2: 2.87 | 2.78 | ✓ | 1.03 |
| resource 3: 2.90 | 2.51 | ✓ | 1.16 |
| resource 4: 1.36 | 1.33 | ✓ | 1.02 |
| resource 5: 1.53 | 1.15 | ✓ | 1.33 |
| E.F. = Σj=1Nr {ΣiϵS1rij/τ1j}/Nr = 1.11 | | | |

Figure 11:
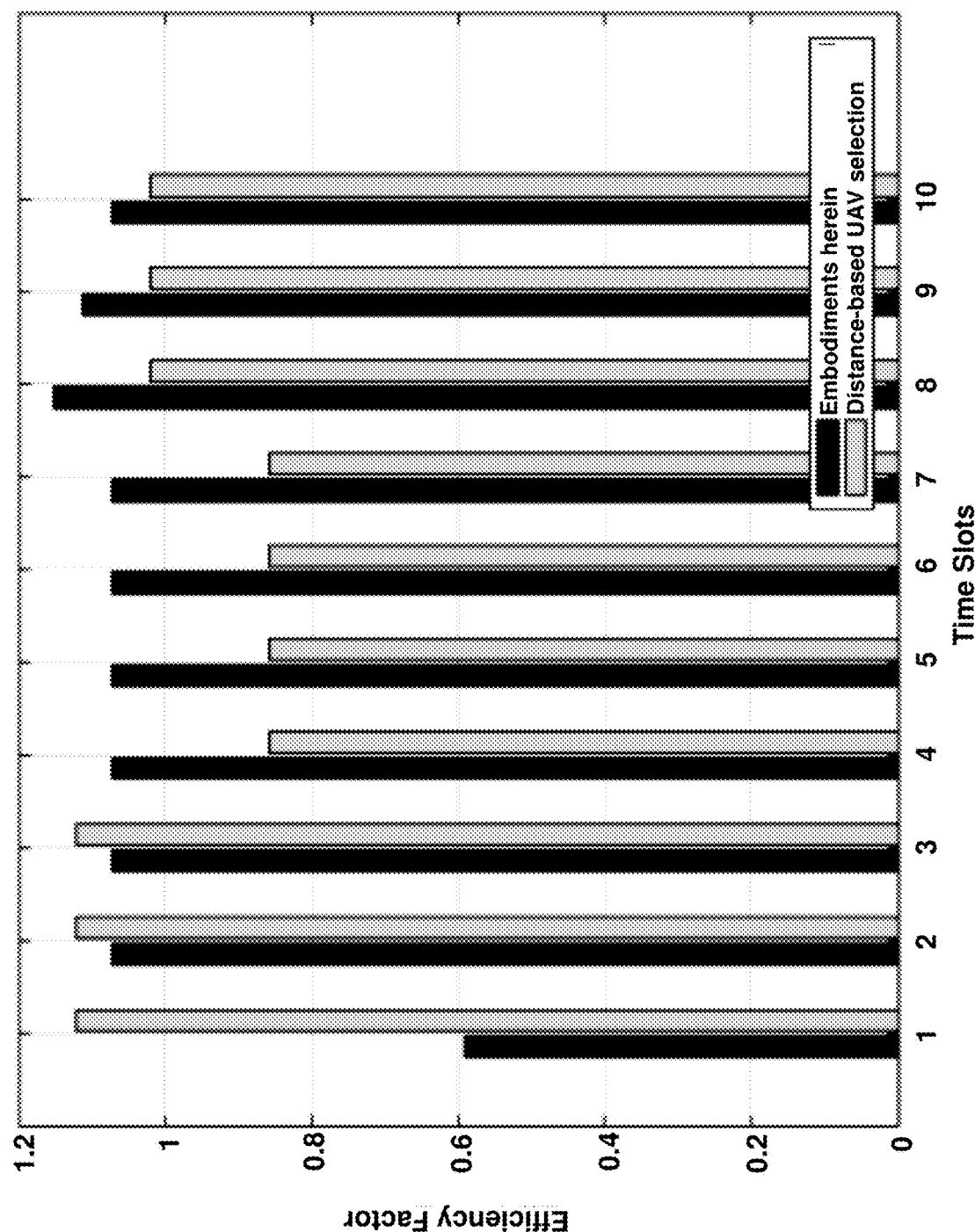
FIG. 11 is a graphical representation illustrating the efficiency factor for the coalition formation method provided by the embodiments herein compared to the case of selecting the closest UAVs.

In FIG. 11, with reference to FIGS. 1 through 10, the efficiency factor of the method 200 after forming stable coalitions is compared to the scenario in which the closest UAVs are assigned to the targets without considering the resources offered by these UAVs. As shown in FIG. 11, method 200 outperforms the case of distance-based UAVs selection for different system settings over the course of time.

Figure 12:
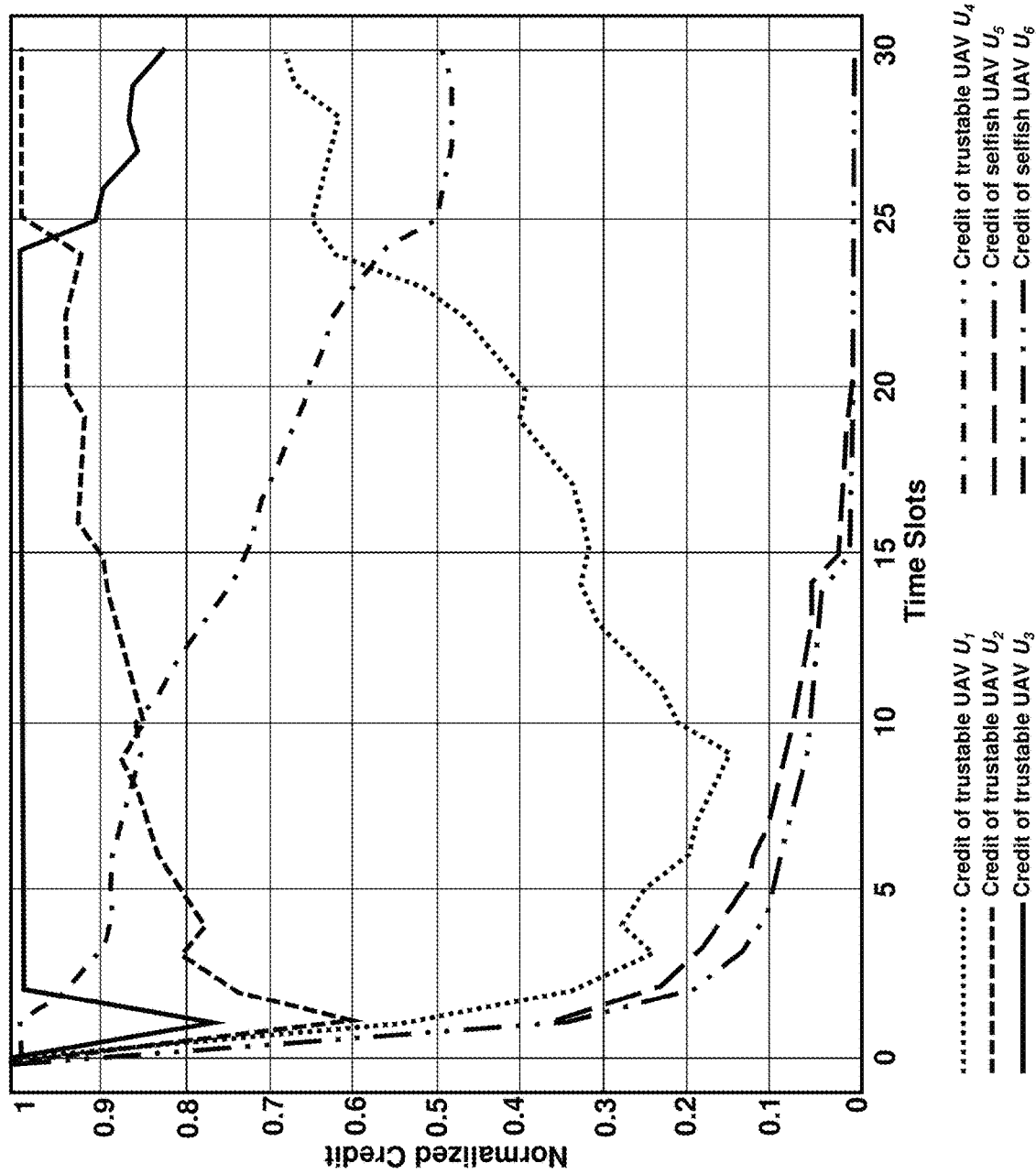
FIG. 12 is a graphical representation illustrating the change in cooperative credit of UAVs based on their cooperative/selfish behavior in resource sharing, according to an embodiment herein.

FIG. 12, with reference to FIGS. 1 through 11, evaluates the performance of the coalition formation method 200 in identifying the potential selfish UAVs by showing the change in cooperative credit of six follower-UAVs over time. The credits are normalized to be in the range of [0, 1]. In this scenario, it is assumed that UAVs, $U_5$ and $U_6$ are selfish in the sense that they do not consume the resources they initially committed after joining a coalition. As seen in FIG. 12, the credits of these selfish UAVs, $C_5$ and $C_6$ significantly decrease over time, meaning that these selfish users will not be selected by the leaders in the next rounds of coalition formation. Moreover, other factors including changes in the UAVs' location and the dynamic nature of the task requirements can also play a role in small variations in agents' credits that may result in credit reduction for trustable agents. The slight reduction of credits of $U_3$ and $U_4$ is an example of this.

The leader-follower coalition formation method 200 may be utilized for distributed task allocation and optimizing the cooperative communication between the detected targets 80 and the base station 60 in a heterogeneous network 75 of UAVs $70_1 \ldots 70_x$. A reputation-based approach is provided to monitor the cooperative behavior of UAVs $70_1 \ldots 70_x$ and filter out the selfish UAVs 71 who have not accumulated sufficient collaboration credits. The systems 10, 100 and method 200 enable optimizing several factors including the timely completion of the tasks and preserving the available resources 50 in the network 75 from the perspective(s) of the leader(s) (i.e., device $40_1$ and/or UAV $70_1$), while it benefits follower devices $40_2 \ldots 40_x$ and/or UAVs $70_2 \ldots 70_x$ by lowering their travel times to join the coalitions or combinations of devices 40a or UAVs 70a. The simulation results show the convergence of the method 200 in forming stable coalitions of devices 40a or UAVs 70a with high resource efficiency factors to complete the encountered tasks (i.e. missions 25).

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Those skilled in the art will recognize that the embodiments herein can be practiced with modification within the spirit and scope of the appended claims.

What is claimed is:

1. An integrated decision making and communication system comprising a first device and a plurality of other functionally similar devices communicatively linked to the first device:
wherein the first and each of the plurality of other functionally similar devices contains:
a memory to store a list of targeting resources necessary to execute a mission;
a transceiver to send and receive targeting, resource availability and allocation, and flight status data between communicatively linked devices; and
a processor to enable the first device to:
identify a set of available targeting resources capable of executing the mission based on the data received from the devices;
compare the list of targeting resources necessary to execute the mission from the memory with the set of available targeting resources; and
identify a combination of the devices to execute the mission based on the comparison of the list of targeting resources necessary to execute the mission, device flight status, the set of available targeting resources, and a trust factor of the plurality of other functionally similar devices, wherein the trust factor comprises a reputation of each of the functionally similar devices based on their performance on prior missions and the extent to which the first device can trust that any of the plurality of functionally similar devices can execute the mission;

wherein the first device is configured to autonomously store, transceive, and process the targeting, resource availability and allocation, and flight status data without control by a centralized base station;

wherein the integrated decision making and communications system does not rely on the control of the centralized base station; and wherein the transceiver of the first device further:

transmits a proposal to the plurality of other functionally similar devices to request the plurality of other functionally similar devices to combine their available targeting resources to execute the mission; and receives responses from the plurality of other functionally similar devices of whether they agree to utilize their available targeting resources to execute the mission, or disagree, and elect to retain their available targeting resources for subsequent missions; and wherein each of the plurality of other functionally similar devices' received responses in agreement or disagreement to execute the mission are cumulated so as to identify the trust factor for selection in future missions.

2. The system of claim 1, wherein the processor instructs the transceiver to send messages to the identified combination of the devices to execute the mission.

3. The system of claim 1, wherein the processor of the first device groups the plurality of other functionally similar devices based on possible combinations of devices comprising targeting resources capable of executing the mission.

4. The system of claim 3, wherein the processor of the first device selects the group of the plurality of other functionally similar devices comprising a most efficient utilization of the available targeting resources to execute the mission in a predetermined period of time.

5. The system of claim 1, wherein the devices comprise unmanned aerial vehicles (UAVs).

6. A non-transitory storage medium comprising computer-executable instructions that when executed cause a processor of a first unmanned aerial vehicle (UAV) to:

determine targeting resources used to execute a mission;

generate a set of available targeting resources capable of executing the mission from a group of UAVs in communication with the first UAV;

compare the targeting resources used for executing the mission with the set of available targeting resources;

identify a combination of the UAVs to assist in executing the mission based on the comparison of the targeting resources used for executing the mission, the set of available targeting resources, each UAV's agreement to assist in executing the mission, and a trust factor of each UAV based on each UAV's agreement or disagreement to assist in previous mission executions, wherein the trust factor comprises a reputation of each UAV based on their performance on prior missions and the extent to which the first UAV can trust that any of the group of UAVs can execute the mission; and wherein the processor does not rely on the control of a centralized base station.

7. The machine-readable storage medium of claim 6, wherein the instructions, when executed, further cause the processor to:

identify the group of UAVs; and transmit a request to the group of UAVs to send to the first UAV the available targeting resources for each of the UAVs in order to generate the set of available targeting resources capable of executing the mission.

8. The machine-readable storage medium of claim 6, wherein the instructions, when executed, further cause the processor to generate the set of available targeting resources capable of executing the mission based on an assessment of which combination of the available targeting resources from the group of UAVs best maximizes an efficiency in executing the mission.

9. The machine-readable storage medium of claim 6, wherein the instructions, when executed, further cause the processor to filter out any UAVs from the group of UAVs based on a past performance of executing other missions.

10. The machine-readable storage medium of claim 6, wherein the instructions, when executed, further cause the processor to filter out any UAVs from the group of UAVs based on a real-time assessment of a performance of any of the UAVs utilization of its available targeting resources in executing the mission.

11. The machine-readable storage medium of claim 6, wherein the instructions, when executed, further cause the processor to filter out any UAVs from the group of UAVs that decline to offer available targeting resources in executing the mission.

12. The machine-readable storage medium of claim 6, wherein the instructions, when executed, further cause the processor to:

select the combination of the UAVs to assist in executing the mission; and transmit a coalition message to the selected UAVs to execute the mission.

13. The machine-readable storage medium of claim 6, wherein the instructions, when executed, further cause the processor to:

generate the set of available targeting resources capable of executing the mission based on assigning a predetermined value to each of the available targeting resources provided by each of the UAVs; and determine which combination of UAVs corresponds to the predetermined value of the available targeting resources to complete the mission without overspending the available targeting resources.

14. A method of autonomously assessing a cooperative performance of a task, the method comprising:

operating a first unmanned aerial vehicle (UAV) to search for a target;

upon locating the target, assessing a requirement for the first UAV to perform the task relating to the target;

transmitting a first electronic message to other UAVs capable of assisting the first UAV in performing the task;

receiving at least one second electronic message from the other UAVs identifying available resources from each of the other UAVs to perform the task; and determining which combination of the other UAVs is best capable of assisting the first UAV in performing the task based on a predefined criterion;

wherein the predefined criterion includes a trust factor of each UAV based on each UAV's agreement or disagreement to assist in previous mission executions, wherein the trust factor comprises a reputation of each UAV based on their performance on prior missions and the extent to which the first UAV can trust that any of the group of UAVs can execute the mission; and determining which of the other UAVs is willing to assist in performing the task; and wherein the autonomously assessing the cooperative performance of a task does not rely on the control of a centralized base station.

15. The method of claim 14, further comprising:

selecting the combination of the other UAVs that is best capable of assisting, trusted to assist, and willing to assist the first UAV in performing the task; and transmitting a third electronic message to the other UAVs requesting the selected combination of the other UAVs to assist the first UAV in performing the task.

16. The method of claim 15, further comprising performing the task using the first UAV with the selected combination of the other UAVs.

17. The method of claim 14, further comprising selecting the combination of the other UAVs based on any of a time required to perform the task, resource allocation capable of being provided by the other UAVs, the trust factor associated with the other UAVs, a likelihood of performance of the task based on the available resources from each of the other UAVs, and a willingness to assist in the performance of the task.

18. The method of claim 14, wherein each of the other UAVs comprise a different available resource to assist the first UAV in performing the task.

* * * * *